US011337261B2

(12) United States Patent
Suzuki

(10) Patent No.: US 11,337,261 B2
(45) Date of Patent: May 17, 2022

(54) INFORMATION PROCESSING DEVICE AND INFORMATION PROCESSING SYSTEM

(71) Applicant: SONY CORPORATION, Tokyo (JP)

(72) Inventor: Hideyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/959,492

(22) PCT Filed: Dec. 27, 2018

(86) PCT No.: PCT/JP2018/048004
§ 371 (c)(1),
(2) Date: Jul. 1, 2020

(87) PCT Pub. No.: WO2019/138896
PCT Pub. Date: Jul. 18, 2019

(65) Prior Publication Data
US 2021/0058982 A1    Feb. 25, 2021

(30) Foreign Application Priority Data
Jan. 10, 2018   (JP) .............................. JP2018-001914

(51) Int. Cl.
*H04W 76/10*      (2018.01)
*H04W 4/80*       (2018.01)
(Continued)

(52) U.S. Cl.
CPC ........... *H04W 76/10* (2018.02); *H04W 4/021* (2013.01); *H04W 4/80* (2018.02); *H04W 12/08* (2013.01); *H04W 84/12* (2013.01)

(58) Field of Classification Search
CPC ......... H04W 4/021; H04W 4/70; H04W 4/80; H04W 12/06; H04W 12/08; H04W 12/50;
(Continued)

(56) References Cited

U.S. PATENT DOCUMENTS

2007/0263578 A1*  11/2007  Nakaso ............... H04W 28/16
                                                                                   370/338
2008/0052754 A1*   2/2008  Iga .................... H04W 48/18
                                                                                      726/1
(Continued)

FOREIGN PATENT DOCUMENTS

CN         103828412 A     5/2014
CN         103828413 A     5/2014
(Continued)

OTHER PUBLICATIONS

International Search Report and Written Opinion of PCT Application No. PCT/JP2018/048004, dated Mar. 5, 2019, 08 pages of ISRWO.

(Continued)

*Primary Examiner* — Jean A Gelin
(74) *Attorney, Agent, or Firm* — Chip Law Group

(57) ABSTRACT

The present technology relates to an information processing device and an information processing system which enable setting for establishing connection to a wireless LAN in a simple manner. The present technology includes a user interface that receives a user input concerning connection setting of a second communication path of another information processing device, a communication section that exchanges a command with the other information processing device via a predetermined server by using a first communication path, on the basis of the user input, and a processing section that processes the command. The command includes information that is necessary for the other information processing device to establish the second communication path. The present technology is applicable to an information processing device that performs setting for an IoT (Internet of Things) terminal, for example.

15 Claims, 20 Drawing Sheets

(51) Int. Cl.
*H04W 4/021* (2018.01)
*H04W 12/08* (2021.01)
*H04W 84/12* (2009.01)

(58) Field of Classification Search
CPC ...... H04W 76/10; H04W 84/12; H04L 29/06; H04L 63/083; H04L 69/14; H04L 67/12; H04L 67/18
See application file for complete search history.

(56) References Cited

U.S. PATENT DOCUMENTS

| | | |
|---|---|---|
| 2013/0081113 A1 | 3/2013 | Cherian et al. |
| 2013/0132576 A1* | 5/2013 | Haba ................ G06F 15/17306 709/225 |
| 2013/0217359 A1 | 8/2013 | Cherian et al. |
| 2014/0204833 A1 | 7/2014 | Negishi et al. |
| 2014/0233425 A1 | 8/2014 | Cherian et al. |
| 2015/0189023 A1* | 7/2015 | Kubota ................ G06F 3/1292 455/7 |
| 2016/0278147 A1* | 9/2016 | Adrangi ................ H04L 9/3263 |
| 2016/0360048 A1* | 12/2016 | Yasu ..................... G06V 20/00 |
| 2017/0311115 A1 | 10/2017 | Adrangi et al. |
| 2018/0007140 A1 | 1/2018 | Brickell et al. |
| 2018/0014242 A1* | 1/2018 | Furuta .................. H04W 48/20 |
| 2018/0124028 A1* | 5/2018 | Fujimoto ............. H04W 12/06 |
| 2019/0141526 A1* | 5/2019 | Bahrami .............. H04W 12/08 |
| 2020/0106837 A1 | 4/2020 | Brickell et al. |

FOREIGN PATENT DOCUMENTS

| | | |
|---|---|---|
| CN | 103944740 A | 7/2014 |
| CN | 107258094 A | 10/2017 |
| CN | 109417555 A | 3/2019 |
| DE | 112017002283 T5 | 3/2019 |
| EP | 2757738 A2 | 7/2014 |
| EP | 2761907 A1 | 8/2014 |
| EP | 2761908 A1 | 8/2014 |
| EP | 2827627 A1 | 1/2015 |
| EP | 3272158 A1 | 1/2018 |
| JP | 2014-060623 A | 4/2014 |
| JP | 2015-041951 A | 3/2015 |
| JP | 2015-119457 A | 6/2015 |
| JP | 5755815 B2 | 7/2015 |
| JP | 2016-506659 A | 3/2016 |
| JP | 5882477 B2 | 3/2016 |
| JP | 6062499 B2 | 1/2017 |
| JP | 2017-099021 A | 6/2017 |
| KR | 10-2014-0067157 A | 6/2014 |
| KR | 10-2014-0068240 A | 6/2014 |
| TW | 201635840 A | 10/2016 |
| WO | 2013/048645 A1 | 4/2013 |
| WO | 2013/049292 A1 | 4/2013 |
| WO | 2016/148773 A1 | 9/2016 |
| WO | 2018/005128 A1 | 1/2018 |

OTHER PUBLICATIONS

Extended European Search Report of EP Application No. 18899826.4 dated Jan. 26, 2021, 09 pages.

* cited by examiner

FIG. 5

| USER IDENTIFIER | TERMINAL IDENTIFIER | LINE CONTRACT IDENTIFIER |
|---|---|---|
| AAA | 111111 | aaa |
| BBB | 222222 | bbb |
| CCC | 333333 | ccc |

```
{
"command" : "scan"
"parameter" : {
}
}
```

FIG. 12

```
{
  "ssidList" : [
    {
      "ssid" : "string",      ← CHARACTER STRING OF SSID IS ENTERED
      "rssi" : "string",      ← CHARACTER STRING OF POSITIVE INTEGER VALUE IS ENTERED
      "known" : true,         ← WHEN psk IS KNOWN, VALUE IS true
      "encryption" : [        ← ENCRYPTION ALGORITHM IS DISPLAYED
         "wep", "wpa", "wpa2", "open"
      ]
    }
  ]
}
```

FIG. 15

```
{
"command";"connect",
"parameter[
"ssid":"",   ← CHARACTER STRING OF SSID IS ENTERED
"psk":"",    ← CHARACTER STRING OF PSK IS ENTERED
"enc":"open/wep/wpa/wpa2",   ← ENCRYPTION ALGORITHM IS ENTERED
]
}
```

FIG. 16

```
{
"wifiNetwork":[
  "ssid":"string",   ← SSID OF CONNECTION DESTINATION ACCESS POINT
  "status":"string",  ← CONNECTION STATE (Connected/Disconnected)
  "ip":"XXX.XXX.XXX.XXX"   ← IP ADDRESS
  ]
}
```

FIG. 18

```
{
 "command":"startWPS",   ← COMMAND FOR STARTING WPS FUNCTION OF IoT TERMINAL
 "parameter":[           ← DESIGNATE OPTION IN WPS SETTING
  "pbc"
 ]
}
```

INFORMATION PROCESSING DEVICE AND INFORMATION PROCESSING SYSTEM

CROSS REFERENCE TO RELATED APPLICATIONS

This application is a U.S. National Phase of International Patent Application No. PCT/JP2018/048004 filed on Dec. 27, 2018, which claims priority benefit of Japanese Patent Application No. JP 2018-001914 filed in the Japan Patent Office on Jan. 10, 2018. Each of the above-referenced applications is hereby incorporated herein by reference in its entirety.

TECHNICAL FIELD

The present technology relates to an information processing device and an information processing system. For example, the present technology relates to an information processing device and an information processing system which enable connection setting by a simple operation.

BACKGROUND ART

In recent years, the IoT (Internet of Things) technology of connecting many things to the internet has been proposed. Since many things are connected to the internet by the IoT technology, a user is expected to required to set connection with respect to many things (hereinafter, referred to as wireless devices).

Regarding connection setting for wireless devices, there has also been the Wi-Fi Protected Set up (registered trademark) technology provided by the Wi-Fi Alliance. Thus, a technology of, when performing setting to connect a wireless device to an access point, connecting things to one another if respective buttons on the things are each operated within a certain period of time has been proposed.

PTL 1 proposes enabling connection to a non-cellular access network such as a wireless LAN (Local Area Network) by transmitting and controlling information for establishing connection to the non-cellular access network over a cellular network.

CITATION LIST

Patent Literature

[PTL 1]
Japanese Patent Laid-Open No. 2016-506659

SUMMARY

Technical Problems

In PTL 1, the information for establishing connection to the non-cellular access network is managed by a cellular service provider that manages the cellular network, and thus, performing the control at the service provider side is a prerequisite.

However, a terminal using the IoT technology is assumed to be set in a house or a factory and to be sometimes connected to a non-cellular access network that is not being managed by any cellular service provider, as well. In such a case, connection setting is difficult by using a technology such as that disclosed in PTL 1 in which the cellular service provider side unidirectionally transmits information to perform connection setting.

The present technology has been made in view of these circumstances and enables setting for establishing connection to a non-cellular access network such as a wireless LAN.

Solution to Problems

A first information processing device, which is one aspect of the present technology, includes a user interface that receives a user input concerning connection setting of a second communication path of another information processing device, a communication section that exchanges a command with the other information processing device via a predetermined server by using a first communication path, on the basis of the user input, and a processing section that processes the command. The command includes information that is necessary for the other information processing device to establish the second communication path.

A second information processing device, which is one aspect of the present technology, includes a first communication section that exchanges a command with another information processing device via a predetermined server by using a first communication path, a second communication section that performs communication using a second communication path, and a processing section that processes the command. The command includes information that is necessary for establishing the second communication path.

An information processing system, which is one aspect of the present technology, includes a first information processing device and a second information processing device. In the information processing system, the first information processing device includes a user interface that receives a user input concerning connection setting of a second communication path of the second information processing device, a first communication section that exchanges a command with the second information processing device via a predetermined server by using a first communication path, on the basis of the user input, and a first processing section that processes the command. The second information processing device includes a second communication section that exchanges the command with the first information processing device via the predetermined server by using the first communication path, a third communication section that performs communication using the second communication path, and a second processing section that processes the command. The command includes information that is necessary for the second information processing device to establish the second communication path.

In the first information processing device, which is one aspect of the present technology, a user interface that receives a user input concerning connection setting of a second communication path of another information processing device is provided, a command is exchanged with the other information processing device via a predetermined server by using a first communication path, on the basis of the user input, and the command is processed. The command includes information that is necessary for the other information processing device to establish the second communication path.

In the second information processing device, which is one aspect of the present technology, a command is exchanged with another information processing device via a predetermined server by using a first communication path, communication is performed using a second communication path, and a command is processed. The command includes information that is necessary for establishing the second communication path.

The information processing system, which is one aspect of the present technology, includes at least the first information processing device and the second information processing device.

It is to be noted that each of the information processing devices may be an independent device or may be an internal block included in one device.

Further, a program can be provided by being transmitted via a transmission medium or by being recorded in a recording medium.

Advantageous Effect of Invention

According to one aspect of the present technology, setting for establishing connection to a non-cellular access network such as a wireless LAN can be performed.

It is to be noted that the effect described above is not necessarily limitative, and it is sufficient that any one of the effects disclosed in the present disclosure is provided.

BRIEF DESCRIPTION OF DRAWINGS

FIG. 5 is a diagram depicting one example of data being managed in an IoT terminal database.

FIG. 11 is a diagram depicting one example of a command that is transmitted and received.

FIG. 12 is a diagram depicting one example of a command that is transmitted and received.

FIG. 15 is a diagram depicting one example of a command that is transmitted and received.

FIG. 16 is a diagram depicting one example of a command that is transmitted and received.

FIG. 18 is a diagram depicting one example of a command that is transmitted and received.

DESCRIPTION OF EMBODIMENT

Hereinafter, an embodiment for implementing the present technology (hereinafter, referred to as an embodiment) will be explained.

<Configuration of System>

Figure 1:
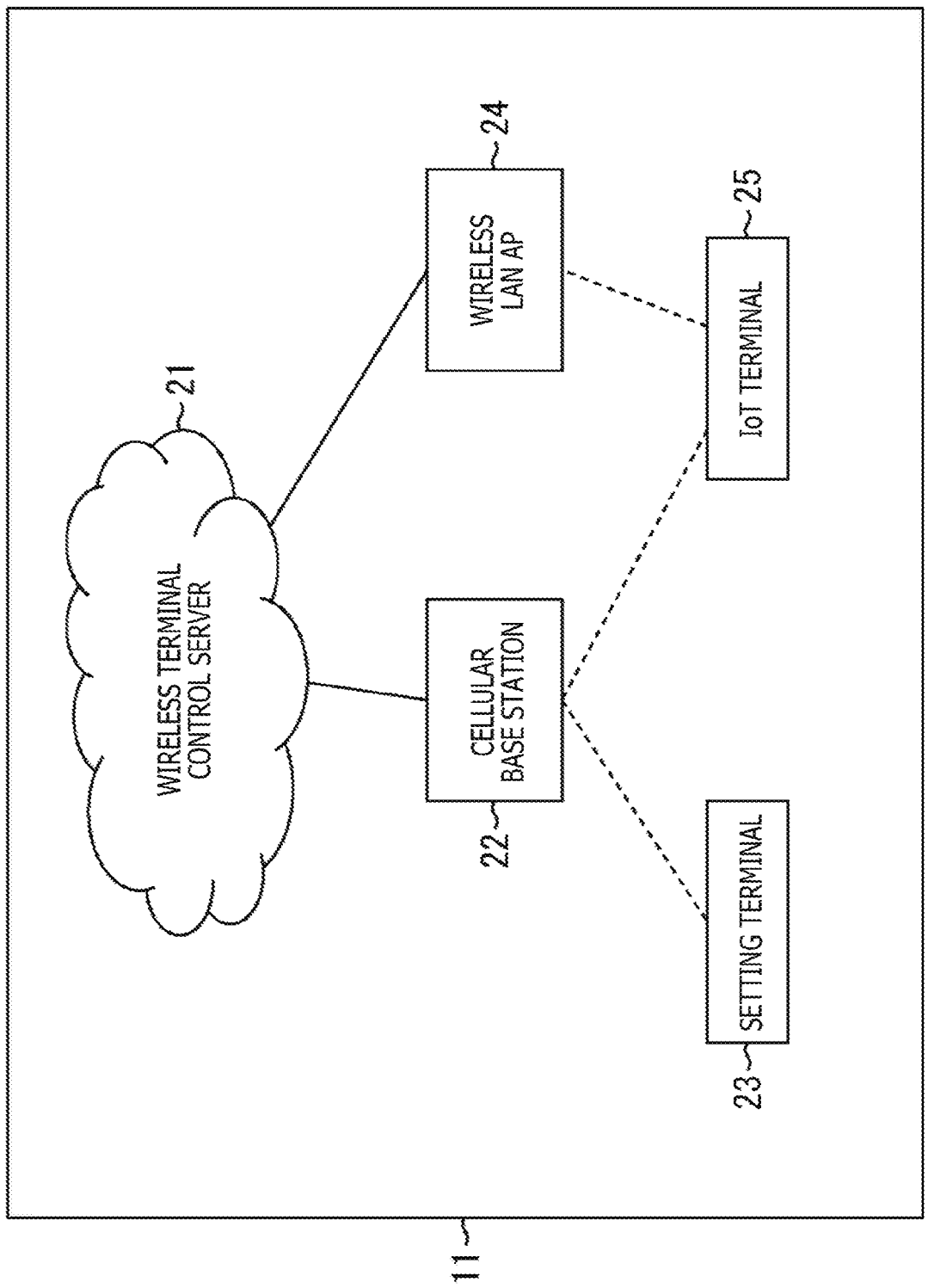
FIG. 1 is a diagram depicting a configuration of one embodiment of an information processing system to which the present technology has been applied.

FIG. 1 is a diagram depicting a configuration of one embodiment of an information processing system to which the present technology is applied. With the information processing system, which will be explained below, setting for connecting an IoT (Internet of Things) terminal to an access point of a wireless LAN can be performed in a simple manner.

An information processing system 11 depicted in FIG. 1 includes a wireless terminal control server 21, a cellular base station 22, a setting terminal 23, a wireless LAN (Local Area Network) access point (AP) 24, and an IoT terminal 25.

The wireless terminal control server 21 manages information in which (a user of) the setting terminal 23 is associated with the IoT terminal 25 and relays data exchange between the setting terminal 23 and the IoT terminal 25 as needed.

The cellular base station 22 is a relay base station for terminals, such as mobile phones including smartphones, which perform communication by a cellular scheme. The cellular scheme is a scheme for performing wireless communication each section into areas and placing a base station in each of the areas. The cellular scheme is used as a communication scheme for mobile phones.

The setting terminal 23 is a smartphone or a tablet terminal, for example. Here, the setting terminal 23 is a device that performs setting for operating the IoT terminal 25 or setting for establishing connection to a network at a stage prior to such an operation and is a terminal that functions as an information processing device for processing predetermined information.

The wireless LAN access point 24 is a device for connecting a terminal having a wireless LAN function to a LAN. Here, the terminal having a wireless LAN function is the IoT terminal 25 which functions as a device to be connected to the wireless terminal control server 21 over a wireless LAN.

The IoT terminal 25 is a terminal that is applicable to IoT. For example, the IoT terminal 25 has a function of measuring a temperature, humidity, atmospheric pressure, lightness, a sound, vibration, and the like and includes a temperature sensor, a humidity sensor, an atmospheric pressure sensor, a lightness sensor, a microphone, a vibration sensor, and the like for measuring these values. In addition, the IoT terminal 25 is included in a lighting unit, a refrigerator, a television receiver, an air conditioner, or a robot, for example. The IoT terminal 25 is a device functioning as an information device which is, for example, the wireless terminal control server 21 and that processes predetermined information.

In FIG. 1, solid lines each represent an established communication path while dotted lines each represent a communication path that is established when a setting process explained below is performed or after the setting process is performed. The wireless terminal control server 21 and the cellular base station 22 are connected to each other to be able to exchange data by using a communication path that is established by a communication scheme such as a cellular phone communication system called LTE (Long Term Evolution), for example. In addition, the wireless terminal control server 21 and the wireless LAN access point 24 are connected to each other to be able to exchange data via a network line.

FIG. 1 depicts the example in which one cellular base station 22, one setting terminal 23, one wireless LAN (Local Area Network) access point (AP) 24, and one IoT terminal 25 are included in the information processing system 1. This is an example for an explanation. The number of each of these devices may be two or more. Needless to say, a case in which the number of any one of these devices is two or more is included in the cope to which the present technology is applicable.

In the information processing system 11 depicted in FIG. 1, the IoT terminal 25 is installed in a factory or a house, for example. The wireless LAN access point 24 is a terminal installed in a range in which communication with the IoT terminal 25 can be performed over a wireless LAN and is installed in a factory or a house, similarly to the IoT terminal 25.

It is to be noted that the IoT terminal 25 may be a mobile device that is sometimes moved to the outside of the communication range of the wireless LAN access point 24. In addition, the explanation will be continued on the assumption that, here, the IoT terminal 25 and the wireless LAN access point 24 are each installed in a factory or a house. However, the present technology is also applicable to the IoT terminal 25 and the wireless LAN access point 24 that are each installed in a site other than factories or houses.

The cellular base station 22 is managed by a service provider that provides communication for mobile phones, for example. On the other hand, the wireless LAN access point 24 is managed by a manager who manages the wireless LAN access point 24 in an installation site. The explanation will be continued on the assumption that the installation site is a house as one example. Thus, the cellular base station 22 is managed by a service provider, and the wireless LAN access point 24 is managed by an individual.

It is to be noted that, although the wireless LAN access points 24 include an access point being managed by a service provider, the present technology, which will be explained below, is applicable to both the wireless LAN access point 24 being managed by a service provider and the wireless LAN access point 24 being managed by an individual.

Examples of the IoT terminal 25 include a terminal that has no user interface or has a user interface which is a simple interface such as a button for turning on/off a power source. For the IoT terminal 25 thus configured, it is difficult to perform setting for establishing connection to the wireless LAN access point 24.

For example, regarding connection setting between a wireless device such as the IoT terminal 25 and a wireless LAN access point, there has been the Wi-Fi Protected Set up (registered trademark) technology provided by the Wi-Fi Alliance. In this technology, plural setting methods including setting using a physical button, setting based on an input of a PIN (Personal Identification Number) code, and setting using NFC (Near field communication) have been proposed.

For example, in the case where setting using a button operation is performed, when connection setting between a wireless device and an access point is performed, an operation of a physical or virtual button within a certain period of time becomes a trigger. A secure communication path is secured between devices on which the respective buttons have been depressed, and setting information is exchanged. Thus, the connection is established.

If a physical button is provided to the IoT terminal 25 in order to perform the setting using a button operation, the design of the appearance of the IoT terminal 25 may be affected. In addition, in order to perform setting using NFC, a wireless NFC interface or the like to be used exclusively for the connection setting needs to be added to the IoT terminal 25. This may lead to an increase in costs such as a material cost or a development cost.

Moreover, in the case where the connection setting is performed through an input of a PIN code, a password issued by an access point needs to inputted to the IoT terminal 25. This setting method cannot be used for the IoT terminal 25 that does not have any user interface for inputting such a password.

For these reasons, connection to the wireless LAN access point 24 is desired to be established in a simple manner using only a function included in the IoT terminal 25 without involving any influence on the design or the like of the IoT terminal 25. Accordingly, an explanation will hereinafter be added of the present technology which enables connection to the wireless LAN access point 24 in a simple manner using only a function included in the IoT terminal 25 without involving any influence on the design or the like of the IoT terminal 25.

<Configuration of Setting Terminal>

Figure 2:
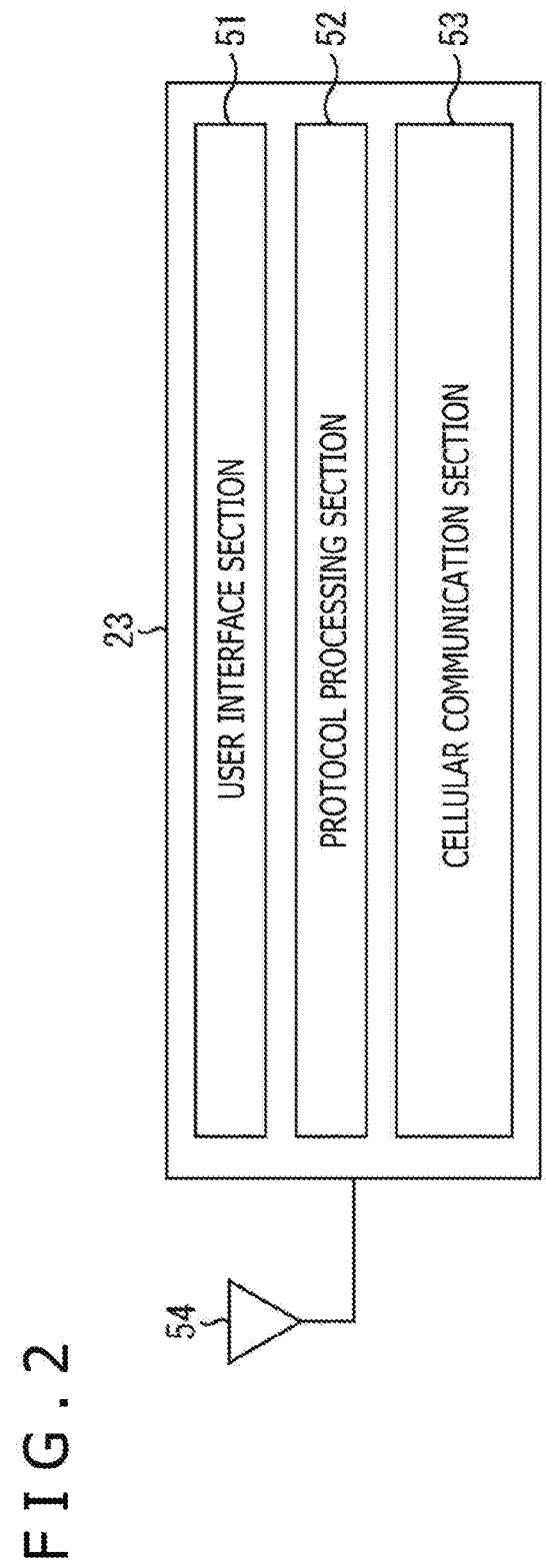
FIG. 2 is a diagram depicting a configuration example of a setting terminal.

FIG. 2 is a diagram depicting a configuration example of the setting terminal 23. The setting terminal 23 includes a user interface section 51, a protocol processing section 52, a cellular communication section 53, and an antenna 54.

The setting terminal 23 is a smartphone, for example, and has functions which are provided to such terminals, that is, a voice communication function and a video processing function, for example. However, illustration of these functions and an explanation thereof are omitted here. A configuration example of sections that are necessary for the following explanation, in other words, sections, in the setting terminal 23, that are necessary for connection setting between the IoT terminal 25 and the wireless LAN access point 24 which will be explained below, is depicted, and an explanation thereof will be added.

Also, a configuration example of sections, in each of the IoT terminal 25 and the wireless terminal control server 21, that are at least necessary for performing connection setting between the IoT terminal 25 and the wireless LAN access point 24 will be depicted later, and an explanation thereof will be added.

The user interface section 51 of the setting terminal 23 has a configuration including a display section (e.g., a display) that displays text and an image, a sound output section e.g., a loudspeaker) that outputs a sound, an input section (e.g., a keyboard or a touch panel) that receives an instruction from a user, and the like.

The protocol processing section 52 analyzes a command received by the cellular communication section 53, creates a command to be transmitted to the IoT terminal 25, and transmits the created command via the cellular communication section 53. It is to be noted that, here, an explanation will be given of an example in which a protocol to be processed by the protocol processing section 52 is based on a JSON (Javascript (registered trademark) Object Notation) format.

The cellular communication section 53 controls communication based on a cellular scheme and communicates with the wireless terminal control server 21 via the cellular base station 22.

The setting terminal 23 communicates with the IoT terminal 25 via the wireless terminal control server 21 through a cellular-scheme communication path (referred to as a cellular communication path). During this communication, information that is necessary for connecting the IoT terminal 25 to the wireless LAN access point 24, in other words, information that is necessary to establish a communication path (referred to as a wireless LAN communication path) of a wireless LAN, is transmitted and received.

Thus, the setting terminal 23 includes the user interface section 51, the cellular communication section 53 that exchanges a command with the IoT terminal 25 via a cellular communication path, and the protocol processing section 52 that creates or processes a command, and the setting terminal 23 is configured to be able to perform exchange of a command including information that is necessary for the IoT terminal 25 to establish a wireless LAN communication path.

<Configuration of IoT Terminal>

Figure 3:
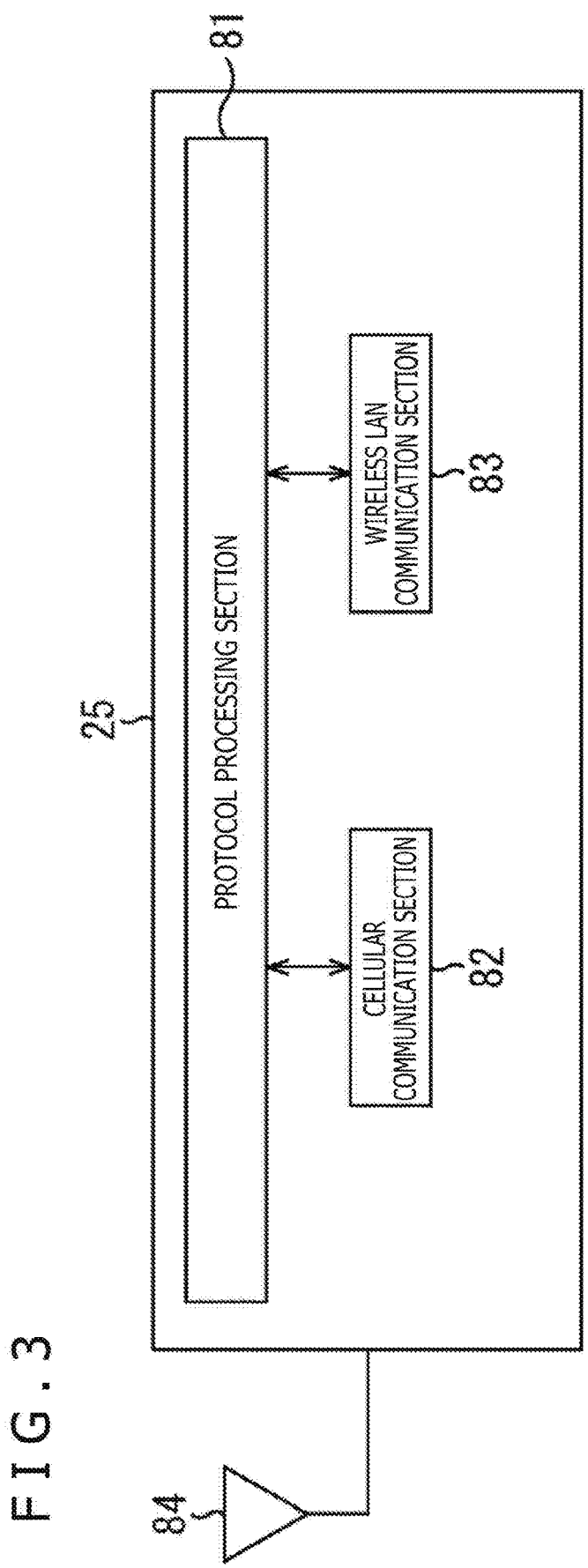
FIG. 3 is a diagram depicting a configuration example of an IoT terminal.

FIG. 3 is a diagram depicting a configuration example of the IoT terminal 25. The IoT terminal 25 includes a protocol processing section 81, a cellular communication section 82, a wireless LAN communication section 83, and an antenna 84.

Similarly to the protocol processing section. 52 setting terminal 23, the protocol processing section 81 processes a command based on a predetermined protocol. The protocol processing section 81 analyzes a command received by the cellular communication section 82, creates a command to be transmitted to the IoT terminal 25, and transmits the command via the cellular communication section 82. Also, when a communication network of a wireless LAN is established or after the communication network is established, the protocol processing section 81 analyses a command received by the wireless LAN communication section 83, creates a command to be transmitted to the IoT terminal 25, and transmits the command via the wireless LAN communication section 83.

It is to be noted that, here, an explanation is given of an example in which a protocol to be processed by the protocol processing section 81 is based on a JSON (JavaScript (registered trademark) Object Notation) format.

The cellular communication section 82 controls communication based on a cellular scheme and communicates with the wireless terminal control server 21 via the cellular base station 22.

The wireless LAN communication section 83 communicates with the wireless terminal control server 21 via a wireless LAN communication path based on the IEEE 802.11 standard, for example.

The IoT terminal 25 includes the cellular communication section 82 and the wireless LAN communication section 83 and is configured to be able to communicate with the wireless terminal control server 21 via a cellular communication path or a wireless LAN communication path. By communicating with the wireless terminal control server 21, the IoT terminal 25 supplies, to the wireless terminal control server 21, data acquired by various sensors of the IoT terminal 25 or is updated on the basis of data from the wireless terminal control server 21.

In order to enable such data exchange, a communication path needs to be secured, and a bandwidth for allowing exchange of necessary data through the communication path needs to secured. Expressions of good coverage or poor coverage are commonly used. When a communication path with good coverage is used to, for example, allow data to be supplied all the time from the IoT terminal 25 to the wireless terminal control server 21, the data from the IoT terminal 25 is expected to be used more efficiently.

Cellular communication paths commonly have good coverage, can easily establish communication paths in a wide area, and further, have good communication performance. In contrast, wireless LAN communication paths have poor coverage than cellular communication paths. While wireless LAN communication paths can easily establish communication paths in predetermined areas such as houses or factories, it sometimes becomes difficult for such wireless LAN communication paths to establish new communication paths beyond the predetermined areas because new communication paths need to be established. In terms of coverage, it is considered that cellular communication paths have an advantage over wireless LAN communication paths.

Generally, communication using a cellular communication path differs from communication using a wireless LAN communication path in that the cost of communication using a cellular communication path is high while the cost of communication using a wireless LAN communication path is low. Some service providers that provide cellular communication paths offer communication charge plans suitable for the IoT terminal 5, but most of these plans are based on measured rate system. For example, the data amount of data to be transmitted from the IoT terminal 25 to the wireless terminal control server 21 is small. Most of the abovementioned plans are suitable for the IoT terminal 25 which transmits such a small amount of data.

However, in the case where full-time connection to a cellular communication path is established and data is continuously transmitted at a predetermined interval, the total amount of the transmitted data is expected to become large so that the charge amount also becomes high, as a result. In order to pre vent such an increase in the charge amount, data is transmitted via a wireless LAN communication path when the wireless LAN communication path is established. Accordingly, a charge amount for use of a cellular communication path can be reduced.

The IoT terminal 25 includes the cellular communication section 82 and the wireless LAN communication section 83 and thus, can perform communication while performing switching between communication using a cellular communication path and communication using a wireless LAN communication path according to the situation. For example, when a wireless LAN communication path is established, the IoT terminal 25 can perform communication via the wireless LAN communication path, and when the coverage becomes poor, the IoT terminal 25 can continue the communication by switching the wireless LAN communication path to the cellular communication path.

Incidentally, as described above, the IoT terminal 25 does not include a section having a function comparative to that of the user interface section 51 included in the setting terminal 23, and thus, setting information for establishing connection to the wireless LAN access point 24 is difficult for the IoT terminal 25. Setting for connecting the IoT terminal 25 to the wireless LAN access point 24 is performed by means of the setting terminal 23, as described below. When such setting is performed, the setting terminal 23 and the IoT terminal 25 communicate with each other via a cellular communication path and via the wireless terminal control server 21.

In order to enable such setting by means of the setting terminal 23, the wireless terminal control server 21 manages information regarding the IoT terminal 25.

<Configuration of Wireless Terminal Control Server>

Figure 4:
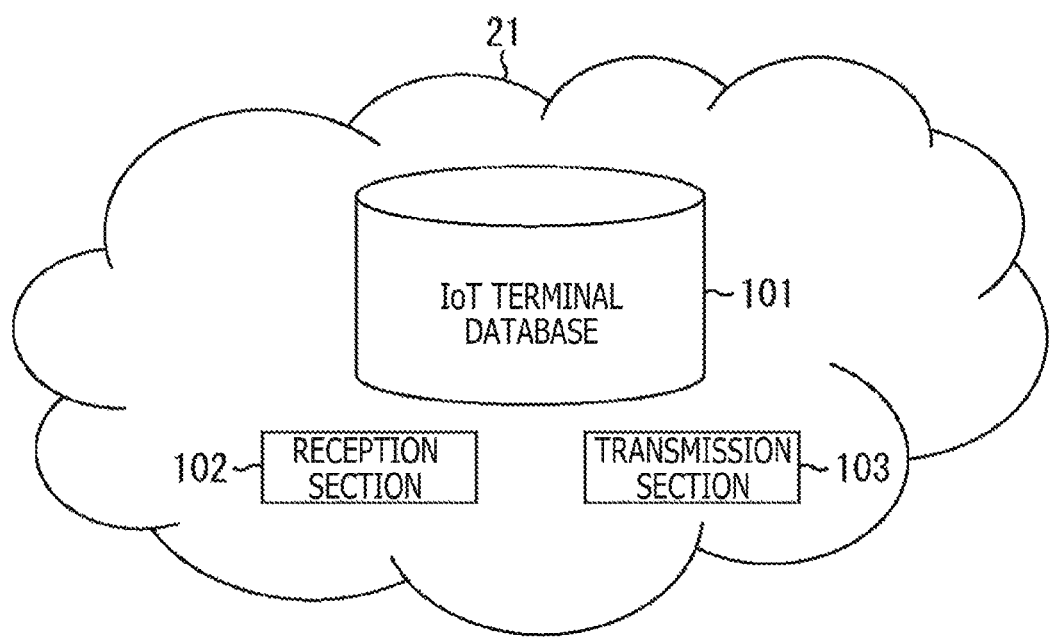
FIG. 4 is a diagram depicting a configuration example of a wireless terminal control server.

FIG. 4 is a diagram depicting a configuration example of the wireless terminal control server 21. The wireless terminal control server 21 includes an IoT terminal database 101, a reception section 102, and a transmission section 103.

It is to be noted that, although the wireless terminal control server 21 has a function of acquiring data from the IoT terminal 25 and a function of analyzing the data as explained above, illustration of these functions is omitted here, and an explanation will be added managing information regarding the IoT terminal 25 and executing a predetermined process by referring to the information being managed, as needed.

The IoT terminal database 101 manages data which will be described below with reference to FIG. 5. The reception section 102 receives commands and data from the setting terminal 23 and the IoT terminal 25 via a cellular communication path or a wireless LAN communication path and processes the commands and data. The transmission section 103 transmits commands and data to the setting terminal 23 and the IoT terminal 25 via a cellular communication path or a wireless LAN communication path.

FIG. 5 is a diagram depicting a configuration of one example of information being managed in the IoT terminal database 101. In the IoT terminal database 101, a prescribed user and the IoT terminal 25 owned by the user are managed in association with each other. In the IoT terminal database 101, a "user identifier," a "terminal identifier," and a "line contract identifier" are managed in association with one another.

The "user identifier" is information for identifying the user. The "terminal identifier" is information for identifying the IoT terminal 25. The "line contract identifier" is an identifier for communication by a cellular scheme subscribed by the IoT terminal 25 identified by the terminal identifier and is, for example, a unique ID number for identifying a phone number written in a SIM card.

For example, a user who is identified by "AAA" as a "user identifier" owns the IoT terminal 25 that is identified by "111111" as a "terminal identifier." Information indicating that an identifier "aaa" is allocated as a "line contract identifier" for the IoT terminal 25 can be read out with reference to the IoT terminal database 101.

Such information is additionally registered at, for example, a timing when the IoT terminal 25 is purchased, the user is registered, or a contract for a cellular line is made. FIG. 5 depicts one example of information being managed in the IoT terminal database 101. Another piece of information may be managed, or another piece of information may be added to the information depicted in FIG. 5 so as to be managed. For example, a flag that indicates whether or not connect on with the wireless LAN access point 24 has been established or information concerning the setting terminal 23 (e.g., information regarding a line contract identifier for the setting terminal 23) may be further managed.

<Operation of Information Processing System>

Figure 6:
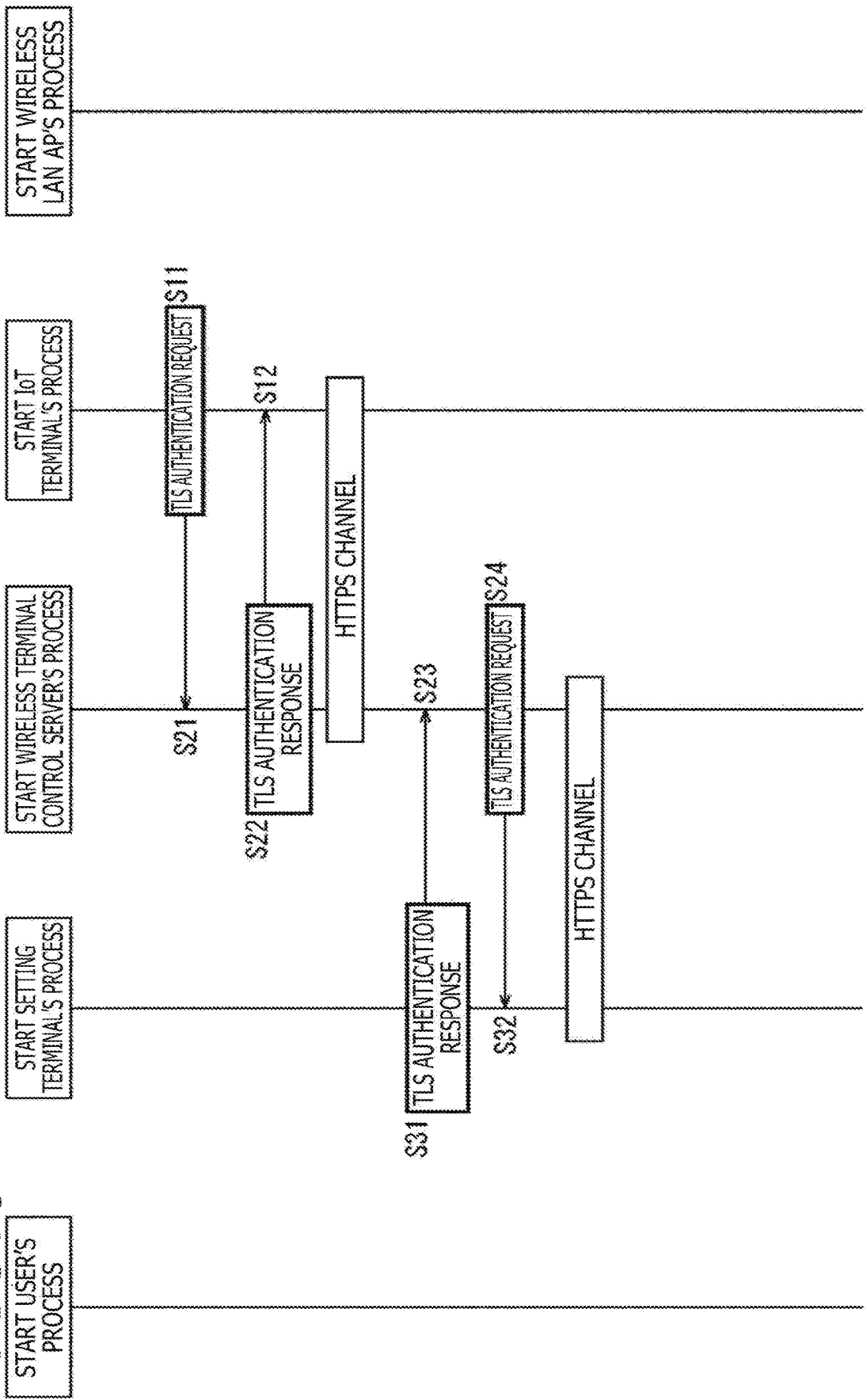
FIG. 6 is a diagram for explaining operation of the information processing system.
Figure 7:
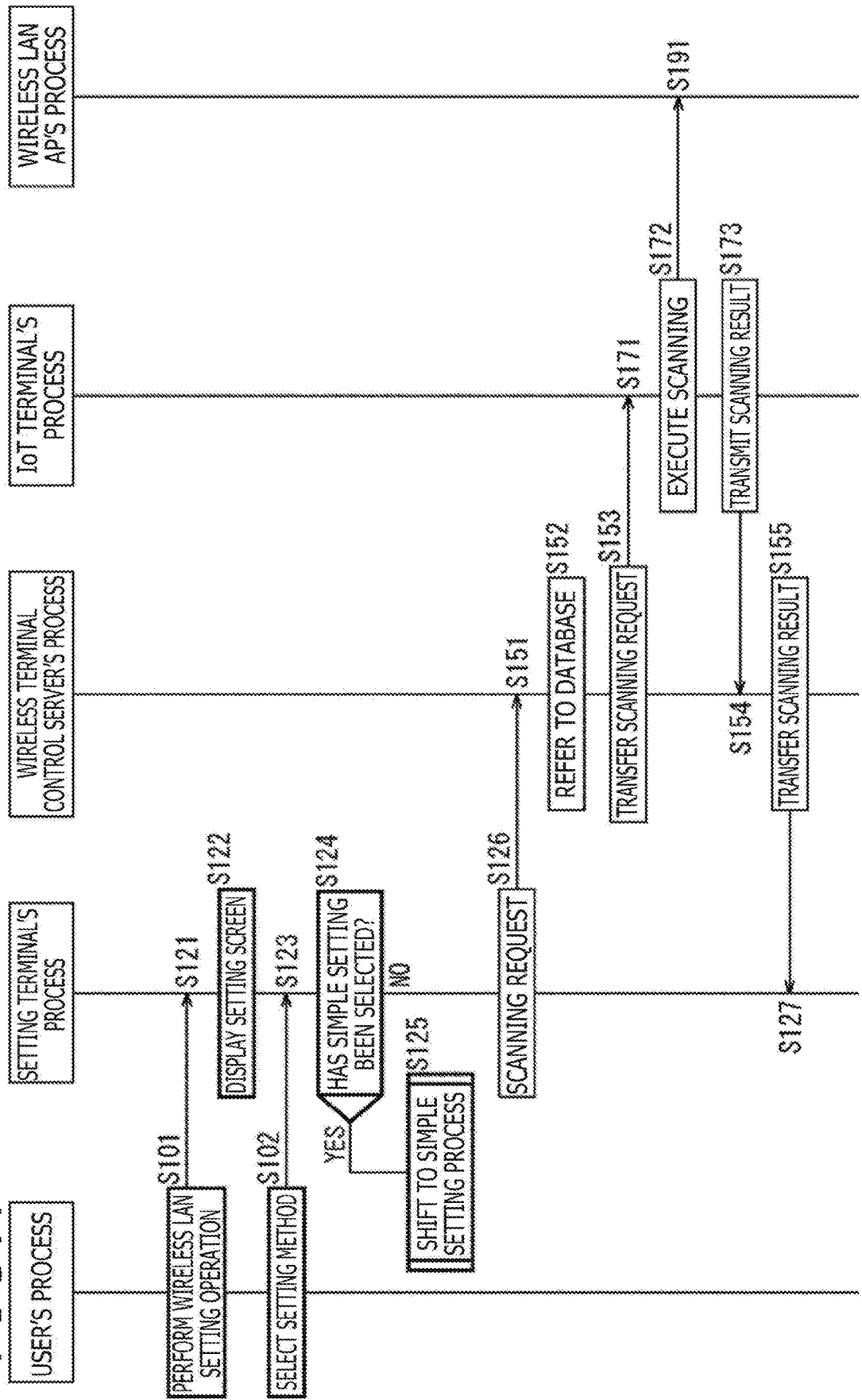
FIG. 7 is a diagram for explaining operation of the information processing system.
Figure 8:
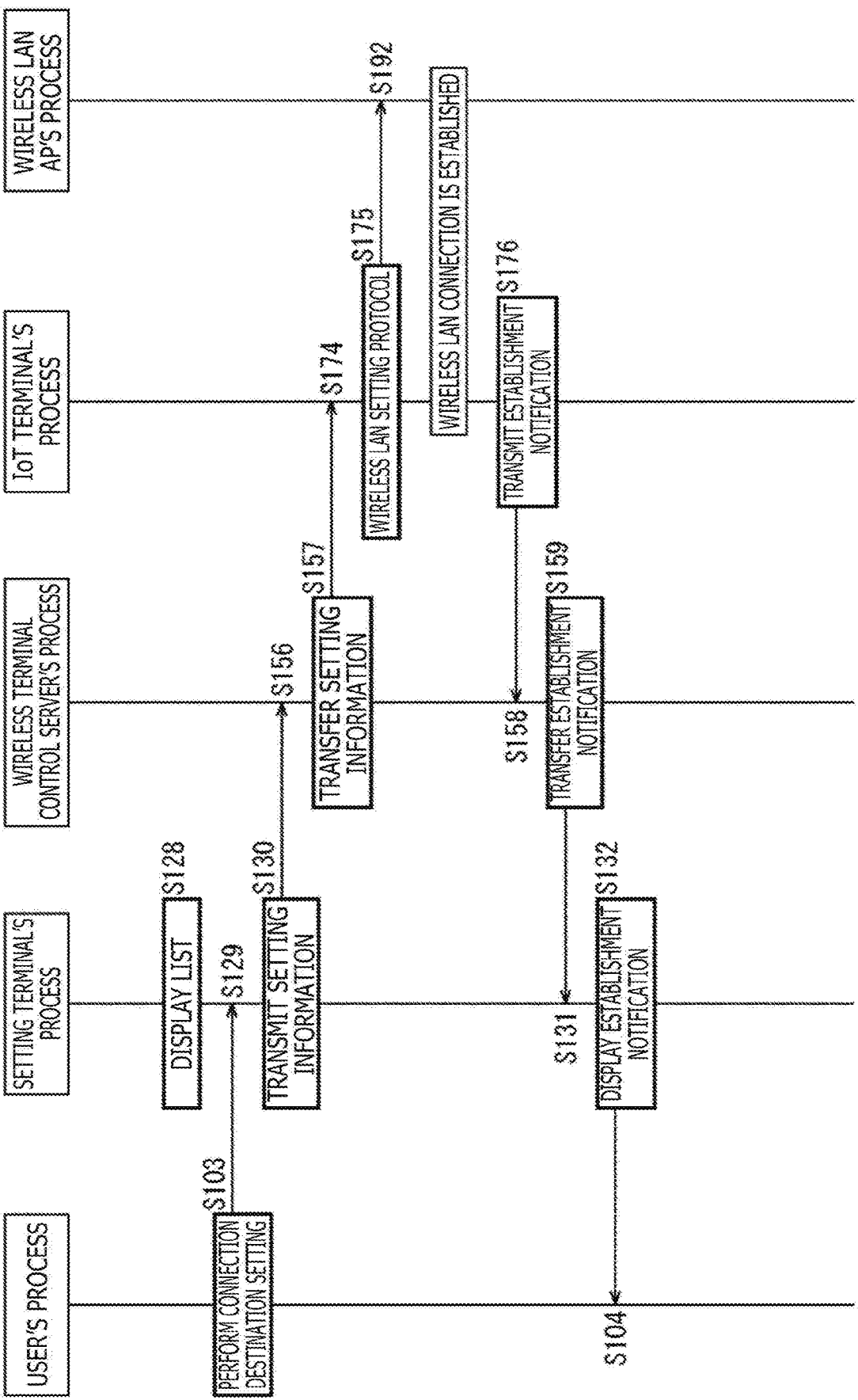
FIG. 8 is a diagram for explaining operation of the information processing system.
Figure 9:
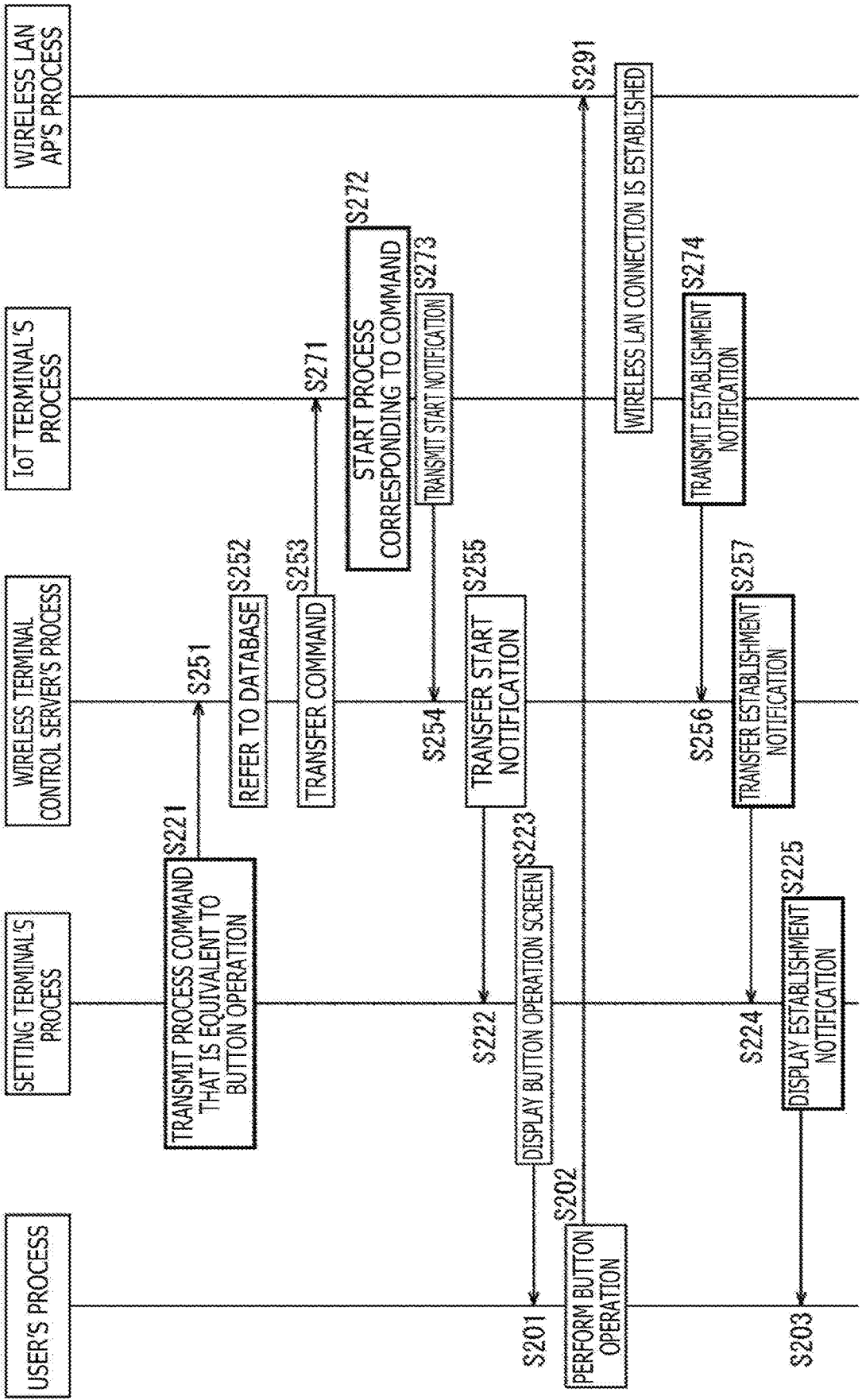
FIG. 9 is a diagram for explaining operation of the information processing system.

Processes in the information processing system 11 depicted in FIG. 1 will be explained with reference to FIG. 6 to FIGS. 6 to 9 are diagrams each depicting respective processes at the setting terminal 23, the wireless terminal control server 21, the IoT terminal 25, and the wireless LAN access point 24, in a time series manner. Further, in each of FIGS. 6 to 9, a process involving a user is also depicted for explanation.

In step S11, the IoT terminal 25 transmits a TLS authentication request to the wireless terminal control server 21. The wireless terminal control server 21 having received the request in step S21 transmits a TLS authentication response to the IoT terminal 25 in step S22.

In step S12, the IoT terminal 25 receives the TLS authentication response from the wireless terminal control server 21. TLS authentication between the wireless terminal control server 21 and the IoT terminal 25 is performed by using information, such as an X.509 certificate, which is set in advance in the IoT terminal 25.

Then, when the TLS authentication between the wireless terminal control server 21 and the IoT terminal 25 is performed successfully, a secure communication path such as an HTTPS channel is established between the wireless terminal control server 21 and the IoT terminal 25. The secure communication path corresponds to a communication path that has been referred to as a cellular communication path in the abovementioned example.

Similarly, a secure communication path also is established between the setting terminal 23 and the wireless terminal control server 21. In step S31, the setting terminal 23 transmits a TLS authentication request to the wireless terminal control server 21. The wireless terminal control server 21 having received the request in step S23 transmits a TLS authentication response to the IoT terminal 25 in step S24.

In step S32, the setting terminal 23 receives the TLS authentication response from the wireless terminal control server 21. TLS authentication between the wireless terminal control server 21 and the setting terminal 23 is performed by using information, such as an X.509 certificate, which is set in advance in the setting terminal 23.

Then, when the TLS authentication between the wireless terminal control server 21 and the setting terminal 23 is performed successfully, secure communication path such as an HTTPS channel is established between the wireless terminal control server 21 and the setting terminal 23. The secure communication path corresponds to a communication path that is referred to as a cellular communication path in the abovementioned example.

Thus, respective secure cellular communication paths are established between the IoT terminal 25 and the wireless terminal control server 21 and between the setting terminal 23 and the wireless terminal control server 21. These cellular communication paths are established by a service provider side managing cellular communication. In other words, while the IoT terminal 25 and the setting terminal 23 each establish a communication path relative to the cellular base station 22, a process related to a selection of the cellular base station 22 with respect to which a communication path is to be established and a process related to connection to the cellular base station 22 are performed by the service provider side managing cellular communication.

After the cellular communication paths are established in the abovementioned manner, a process of connecting the IoT terminal 25 to the wireless LAN access point 24 by using the setting terminal 23 is performed. The process of connecting the IoT terminal 25 to the wireless LAN access point 24 by using the setting terminal 23 will be explained with reference to FIGS. 7 and 8.

In step S101, a user performs a wireless LAN setting operation. For example, the user causes the user interface section 51 (FIG. 2) to display a setting screen such as that depicted in FIG. 10, by operating the setting terminal 23. Here, the explanation will be continued on the assumption that a screen such as that depicted in FIG. 10 is displayed on a display section 201 constituting the user interface section 51.

Figure 10:
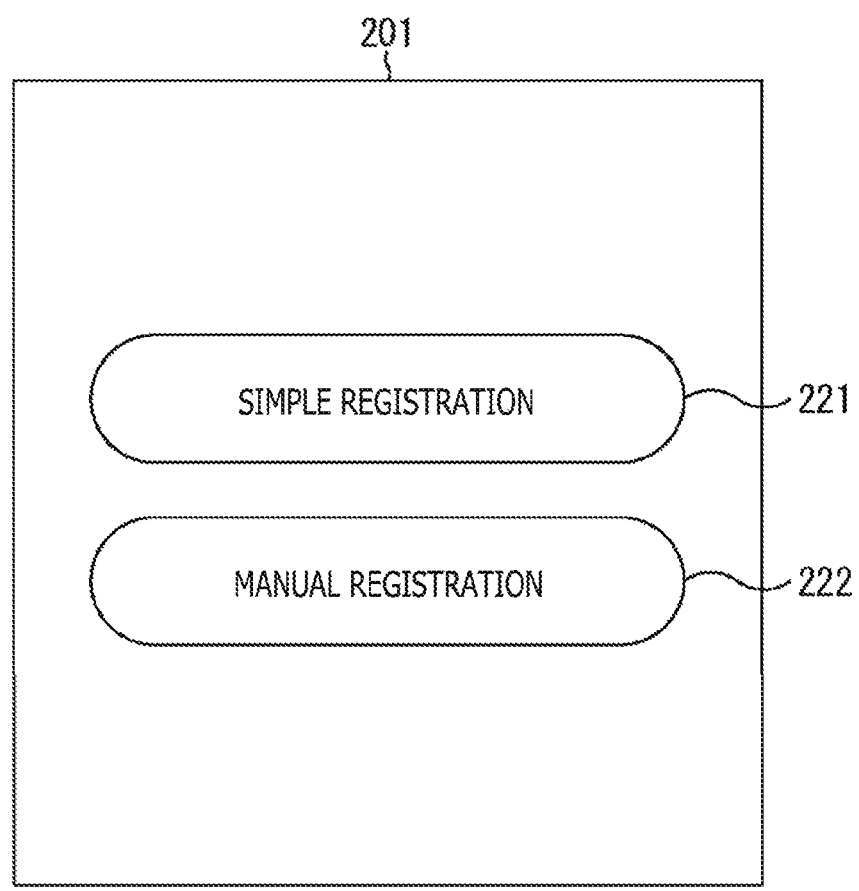
FIG. 10 is a diagram depicting one example of a screen displayed on a display section.

With reference to FIG. 10, a button 221 indicating "simple registration" and a button 222 indicating "manual registration" are displayed on a setting screen displayed on the display section 201. When the button 221 indicating "simple registration" is operated, connection setting based on Wi-Fi Protected Set up (registered trademark) provided by the Wi-Fi Alliance is started. When the button 222 indicating "manual registration" is operated, connection setting based on a user's input of a PSK (Pre-Shared Key) and an SSID (Service Set Identifier) is started.

The user can start setting of connection to a wireless LAN by operating either one of the button 221 or the button 222 displayed on the display section 201. It is to be noted that FIG. 10 depicts the example in which two options are displayed. However, another option or a message may be displayed, as a matter course. For example, an option to "cancel" or a message indicating "select either one" may be displayed, in addition to the abovementioned options.

Also, the phrases on the button 221 and the button 222 are not limited to "simple registration" and "manual registration," and other phrases may be used. For example, a phrase which reads "registration through button operation" may be used in place of the phrase which reads "simple registration" because the "simple registration" includes a process in which a user operates a button provided to the wireless LAN access point 24, as explained below. In addition, for example, a phrase which reads "search for wireless LAN access point" may be used in place of the phrase which reads "manual registration" because the "manual registration" includes a process of searching for the wireless LAN access point 24, as explained below.

Referring back to FIG. 7, when, in step S101, the user operates the setting terminal 23 to start a wireless LAN setting operation, the operation is received by the setting terminal 23 in step S121. For example, the user performs the wireless LAN setting operation by operating a touch panel, as an operation input section, constituting the user interface section 51 (FIG. 2).

In response to the user's operation, the setting terminal 23 causes the display section 201 to display a setting screen such as that depicted in FIG. 10 in step S122. In step S102, the user views the setting screen displayed on the display section 201 of the setting terminal 23 and then, in this case, selects either one of the button 221 or the button 222.

The result of the selection made by the user is received by the setting terminal 23 in step S123. In step S124, the setting terminal 23 determines whether or not the result of the user's selection is simple setting. In the case where the button 221 indicating "simple registration" is selected, the process proceeds to step S125. In the case where the button 222 indicating "manual registration" is selected, the process proceeds to step S126.

Here, the case where the button 222 indicating "manual registration" is selected will be explained first. The case where the button 221 indicating "simple registration" is selected will be explained later with reference to FIG. 9.

In step S126, the setting terminal 23 issues, to the IoT terminal 25, a command requesting a search for the wireless LAN access point 24 that is located in the vicinity of the IoT terminal 25. The setting terminal 23 transmits the command via the wireless terminal control server 21 because any communication path for transmitting the command direct to the IoT terminal 25 has not been established.

The command from the setting terminal 23 is transmitted to the wireless terminal control server 21 via the cellular base station 22 (FIG. 1). The wireless terminal control server 21 transmits, to the IoT terminal 25, the command from the setting terminal 23, via the cellular base station 22.

In order to implement such transfer of the command, when the wireless terminal control server 21 receives the command from the setting terminal 23 in step S151, the wireless terminal control server 21 specifies the IoT terminal 25 to which the command is to be transferred, by referring to the IoT terminal database 101 (FIGS. 4 and 5), in step S152.

Reference to FIG. 5 will be made again. FIG. 5 is a diagram depicting one example of information being managed in the IoT terminal database 101. Reference to information regarding the "user identifier" in the IoT terminal database 101 is made to identify the setting terminal 23 (user of the setting terminal 23) that has transmitted the command. When transmitting the command to the wireless terminal control server 21, the setting terminal 23 transmits the command by including the user identifier in the command. The wireless terminal control server 21 reads out, from the IoT terminal database 101, information regarding a user identifier that matches the received user identifier.

For example, in the case where the user identifier transmitted from the setting terminal 23 is "AAA," "111111" and "aaa" are read out as the "terminal identifier" and the "line contract identifier," respectively. Since the terminal identifier is read out, the IoT terminal 25 is identified. Further, since the line contract identifier is read out, information (e.g., telephone number) for communicating with the IoT terminal 25 is specified.

In the abovementioned manner, the wireless terminal control server 21 specifies to which IoT terminal 25 the setting terminal 23 is trying to transmit a command and transfers the command from the setting terminal 23 to the IoT terminal 25 on the basis of the result of the specification. For example, in the abovementioned example, connection to the IoT terminal 25 having "111111" as a "terminal identifier" is established through an established cellular communication path on the basis of the information regarding "aaa" as a "line contract identifier," and then, process of transferring the command performed at the wireless terminal control server 21.

Figure 11:
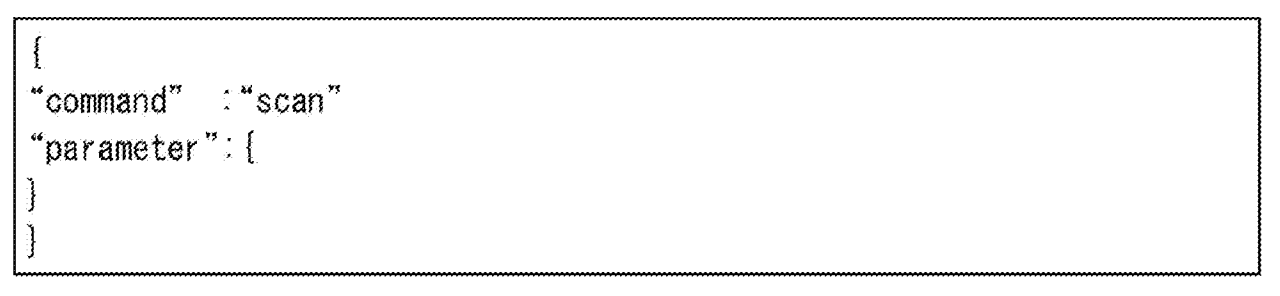

Here, FIG. 11 depicts one example of a control command which is created by the setting terminal 23 and is transmitted from the setting terminal 23 to the IoT terminal 25 via the wireless terminal control server 21. The command depicted in FIG. 11 is one example of a scan command format for issuing a request for scanning the wireless LAN access points 24 that are located in the vicinity of the IoT terminal 25.

As the command, a JSON format command can be used. In the case where the control command for issuing a request for scanning is created by a JSON format, a control command in which a value "scan" is written for a name "command" on the basis of the scan command format, as depicted in FIG. 11, is created.

When the IoT terminal 25 receives such control command in step S171 (FIG. 7), scanning is performed in response to the control command in step S172. By performing scanning, the IoT terminal 25 acquires information regarding the wireless LAN access points 24 that are located in the vicinity of the IoT terminal 25. For example, a command regarding the scanning result such as that depicted in FIG. 12 is created on the basis of the acquired information, and the command is transmitted to the setting terminal 23 (step S173).

FIG. 12 is a diagram depicting one example of the scanning result command format. In the scanning result command format depicted in FIG. 12, items named "ssid," "rssi," "known," and "encryption" are listed in an "ssidList."

As a value for the name "ssid," a character string of an SSID representing the identifier of the wireless LAN access point 24 is entered. As a value for the name "rssi," a character string of a positive integer representing the intensity of radio waves is entered.

As a value for the name "known," "true" is written when a PSK (Pre-Shared. Key) is known, and "false" is written when the PSK is unknown. In FIG. 11, the case when the PSK is known is depicted, and a truth value "true" is written.

As a value for the name "encryption," an encryption algorithm applicable to the wireless LAN access point 24 is written. In the example in FIG. 11, character string values such as "wep," "wpa," "wpa2," and "open" are written so that it is indicated that these encryption algorithms can be applied.

The scanning result command format depicted in FIG. 11 is a format in which information regarding one wireless LAN access point 24 is written. Accordingly, in the case where plural wireless LAN access points 24 are detected, "ssid," "rssi," "known," and "encryption" are written for each of the plural wireless LAN access points 24.

On the basis of such scanning result command format, a scanning result command representing the scanning result is created by the IoT terminal 25 in step S173 (FIG. 7), and the scanning result command is transmitted to the setting terminal 23. Also in this case, any communication path for allowing direct communication is not established between the IoT terminal 25 and the setting terminal 23. Accordingly, the scanning result command is temporarily transmitted to the wireless terminal control server 21 via a cellular communication path.

After receiving, in step S154, the scanning result command created on the basis of a scanning result command format such as that depicted in FIG. 12 from the IoT terminal 25, the wireless terminal control server 21 transfers the scanning result command to the setting terminal 23 in step S155.

The setting terminal 23 receives the scanning result command transferred from the wireless terminal control server 21 in step S127, and the process proceeds to step S128 (FIG. to display a list. The setting terminal 23 analyzes the scanning result command, creates a list of the SSIDs of the wireless LAN access points 24 detected as being located in the vicinity of the IoT terminal 25, and di plays the list on the display section 201.

Figure 13:
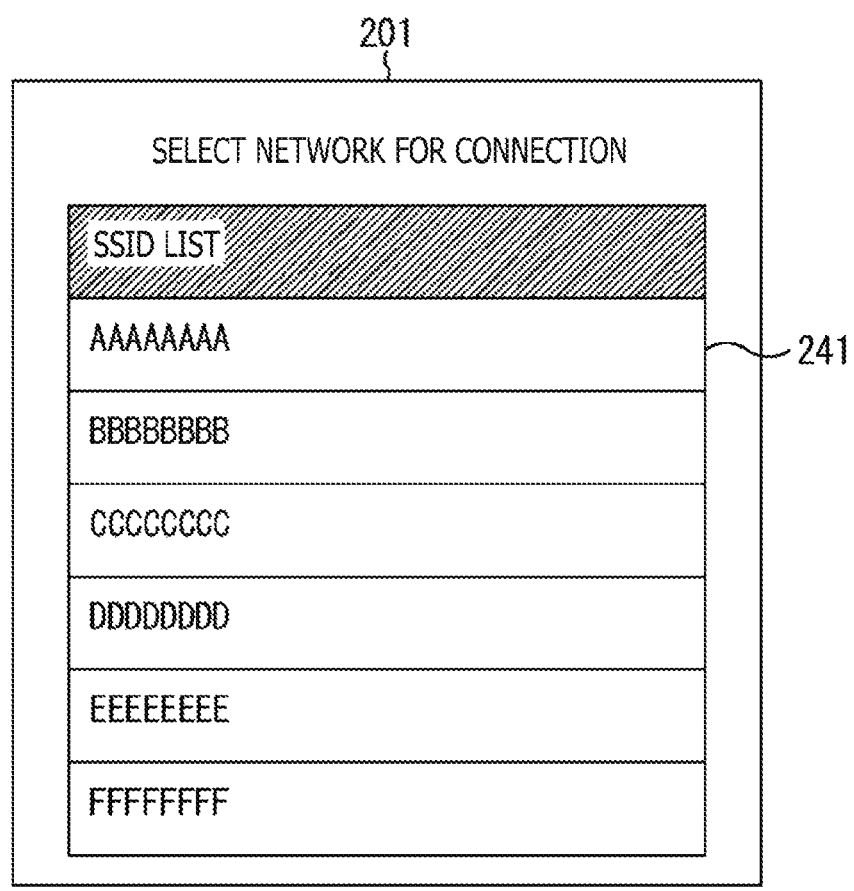
FIG. 13 is a diagram depicting one example of a screen displayed on the display section.

FIG. 13 is a diagram depicting one example of the list which is displayed on the display section 201 of the setting terminal 23 in step S128. A phrase which reads "SSID list" is indicated on the upper part of a list 241, and SSIDs such as "AAAAAAAA," "BBBBBBBB," "CCCCCCCC," "DDDDDDDD," "EEEEEEEE," and "FFFFFFFF" are indicated under the phrase. Here, the case where six wireless LAN access points 24 each having such SSID is explained as an example.

Not only the SSIDs but also, for example, information, such as the reception intensity, included in the scanning result command may be displaced on the list 241. In the screen example depicted in FIG. 13, a message which reads "select network for connection" is c splayed on the upper part of the list 241. By reading this message, the user can recognize that the user is only required to select a network with respect to which the user desires to establish connection, which, in his case, is the wireless LAN access point 24, from among the SSIDs displayed in the list 241.

In the case where the user selects, from the list 241, a network (SSID in this case) with respect to which the user desires to establish connection, on the basis of such recognition in step S103, the display on the splay section 201 is switched to a password input screen.

Figure 14:
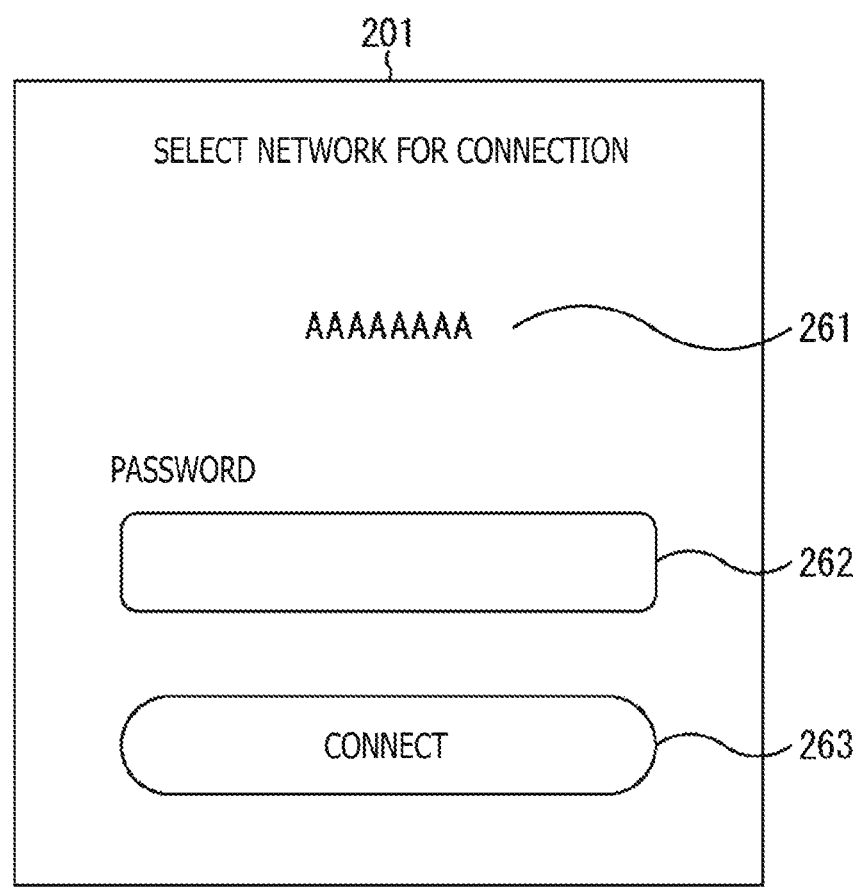
FIG. 14 is a diagram depicting one example of a screen displayed on the display section.

FIG. 14 is a diagram depicting one example of the password input screen which is displayed on the display section 201. FIG. 14 depicts the case where the user has selected the SSID "AAAAAAAA." In a region 261 that is provided under a message which reads "select network for connection" and is d t splayed on the upper part of the screen, "AAAAAAAA" is indicated.

An input field 262 to which a password is to be inputted is displayed under the region 261. The user in puts, to the input field 262, a password for the wireless LAN access point 24 that been selected as a connection destination. For example, when the input field 262 is tapped, a keyboard (not depicted) is displayed to be superimposed thereon, whereby a character string which is the password can be inputted through an operation performed on the keyboard. Here, the password to be inputted to the input field 262 is a PSK (Pre-Shared Key).

A button 253 indicting "connection" is displayed below the input field 262. When the button 253 is operated, information including the password inputted to the input field 262 is transmitted, upon such operation as a trigger, to the IoT terminal 25 via the wireless terminal control server 21.

That is, when the user inputs a password in order to set a connection destination in step S103 (FIG. 8), the operation processed by the setting terminal 23 in step S129 so that a setting command for the tom terminal 25 to set the wireless LAN access point 24 and a communication path is created.

FIG. 15 depicts one example of the setting command format. In the setting command format depicted in FIG. 15, a name "command" is written, and "connect" is written as the value thereof. From this member, it is clear that this command is a connect (connection) command.

As an object value, "parameter" is written. For the object value "parameter," members such as "ssid," "psk," and "enc" are written.

As a value for the name "ssid," character string of an SSID that is the identifier of the wireless LAN access point 24 is entered. In the case of the setting command format, the SSID of the wireless LAN access point 24 selected by the user, that is, for example, the value "AAAAAAAA" in the example in FIG. 14 described above, is entered.

As a value for the name "psk," a password inputted to the input field 262 on the password input screen depicted in FIG. 14 that is, a PSK (Pre-Shared Key), is used. As a value for the name "enc," an encrypt on algorithm which is applicable to the wireless LAN access point 24 that has been selected as a connection destination is written. In the example in FIG. 15, the value of character strings such as "open," "wep," "wpa," and "wpa2" are written so that it is indicated that these encryption algorithms can be applied.

When such a setting command is created, the setting command is transmitted from the setting terminal 23 to the IoT terminal 25 via the wireless terminal control server 21.

In step S130 (FIG. 8), the setting terminal 23 creates the setting command and transmits the command to the wireless terminal control server 21 through a cellular communication path. The wireless terminal control server 21 receives the setting command from the setting terminal 23 in step S156 and transfers the received setting command to the IoT terminal 25 that has already been identified, in step S157.

Thus, information, such as an SSID and a PSK, that is necessary to establish connection to the wireless LAN access point 24, is generated at the setting terminal 23 and is supplied to the IoT terminal 25. Therefore, the IoT terminal 25 that does not include a user interface can also acquire information that is necessary to establish connection to the wireless LAN access point 24 and can be connected to the wireless LAN access point 24.

The IoT terminal 25 receives the setting command in step S174 and executes, relative to the wireless LAN access point 24, a wireless LAN setting protocol by using the information included in the received setting command, in step 75. For example, the IoT terminal 25 sets an SSID and a PSK that are written in the setting command and executes a predetermined protocol such as a 4-WAY Handshake, which is defined by the IEEE 802.11 specification, so that a wireless LAN communication path to the wireless LAN access point 24 is established.

Accordingly, the wireless LAN communication path between the IoT terminal 25 and the wireless LAN access point 24 is established. After the wireless LAN communication path is established, the IoT terminal 25 can make access to the wireless terminal control server 21 via the cellular base station 22 and can also make access to the wireless terminal control server 21 via the wireless LAN access point 24.

After the wireless LAN communication path is established, the IoT terminal 25 gives an establishment notification for giving a notice on the establishment to the setting terminal 23 step 3176. The IoT terminal 25 creates a connection-state response command based on a connection-state response command format depicted FIG. 16, for example. In FIG. 16, items named "ssid," "status," and "ip" are provided for "wifiNetwork."

As a value for the name "ssid," a character string of an SSID that is the identifier of the wireless LAN access point 24 as the connection destination is entered. As a value for the name "status," "Connected" is written when connection is established, and "Disconnected" is written when connection is not established. As a value for the name "ip," the IP address of the wireless LAN access point 24 is written.

The connection-state response command thus created is transmitted from the IoT terminal 25 to the setting terminal 23 via the wireless terminal control server 21 in step S176. Transmission of the connection-state response command from the IoT terminal 25 to the wireless terminal control server 21 may be implemented by communication via the connected wireless LAN access point 24 or by communication via the cellular base station 22.

The wireless terminal control server 21 having received the connection-state response command transmitted from the IoT terminal 25 in step S158 transfers the connection-state response command to the setting terminal 23 via a cellular communication path in step S159.

The setting terminal 23 having received the connection-state response command transferred from the wireless terminal control server 21 in ep S131 displays a setting completion notification screen on the display section 201 in step S132.

Figure 17:
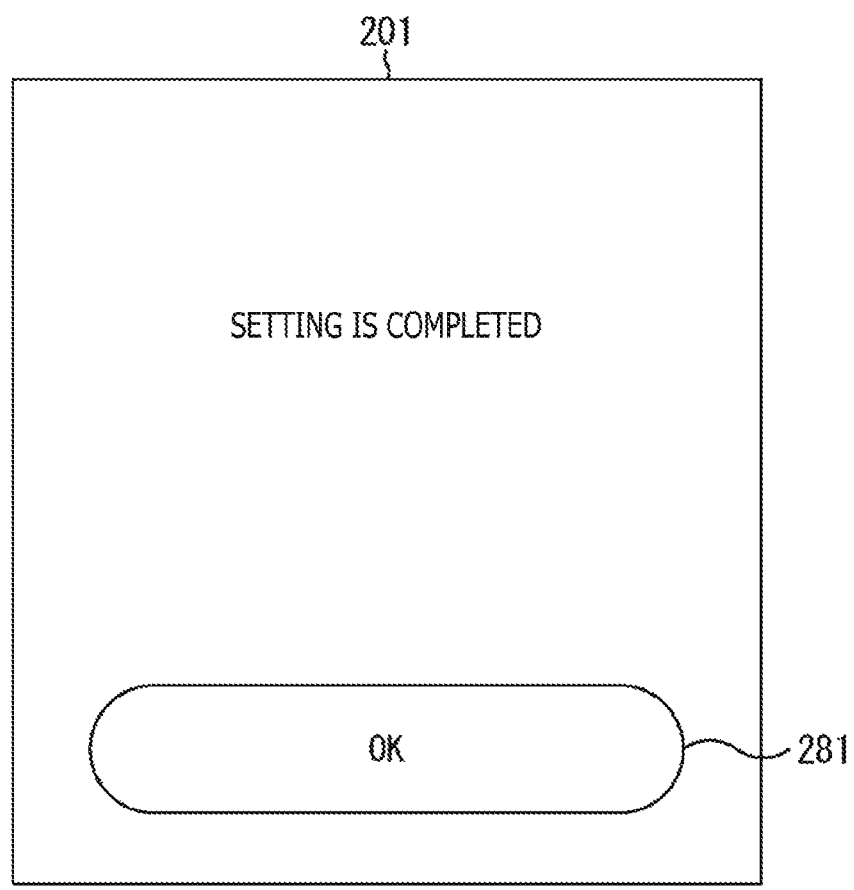
FIG. 17 is a diagram depicting one example of a screen displayed on the display section.

FIG. 17 is a diagram depicting one example of a setting completion notification screen. A message which reads "setting is completed" and a button 281 indicating "OK" are displayed on the display section 201. By viewing the message which reads "setting is completed," the user recognizes that the IoT terminal 25 and the wireless LAN access point 24 have successfully been connected to each other and operates the button 281 to complete the process.

Thus, by means of the setting terminal 23 having a user interface, connection setting between the wireless LAN access point 24 and the IoT terminal 25 having no user interface (or having a user interface with respect to which input of a password, etc., is difficult) can be performed.

It is to be noted that, in the case where connection setting between the IoT terminal 25 and the wireless LAN access point 24 has failed to be completed, in other words, in the case where "Disconnected" is written as the "status" value in the connection information response command depicted in FIG. 16, a screen for inducing an input of password (PSK) may be displayed again in place of the connection completion notification screen depicted in FIG. 17 such that setting is performed again.

In addition, in the case where the connection information response command transmitted from the IoT terminal 25 is received by the wireless terminal control server 21 (the connection information response command is transferred), information which is, for example, a flag, indicating that connection setting with respect to the wireless LAN access point 24 is completed, may additionally be registered in the IoT terminal database 101 (FIG. 5), so as to be associated with the corresponding information.

In the case where one user owns plural IoT terminals 25 and plural terminal identifiers associated with one user identifier are managed in the IoT terminal database 101, provision of such flag allows the IoT terminal 25 for which connection setting with respect to the wireless LAN access point 24 has been completed to be distinguished from the IoT terminal 25 for which connection setting with respect to the wireless LAN access point 24 has not been completed.

As a result of such distinction, the case where, in step S152 (FIG. 7), for example, the wireless terminal control server 21 refers to the IoT terminal database 101 and finds that plural IoT terminals 25 for which connection setting has not been completed are associated with the user (setting terminal 23) having made access, information regarding the abovementioned IoT terminals 25 can be presented to the user. In addition, when the information is presented, the user can select the IoT terminal 25 for which the user desires to perform connection setting.

Next, in step S124 (FIG. 7), simple setting is determined to have been selected, and the process proceeds to step S125. Processes that are performed when the process is shifted to the simple setting process will be explained with reference to a flowchart FIG. 9.

When, in step S221, the user operates the button 221 indicating "simple registration" while the setting screen depict d in FIG. 10 is displayed on the display section 201 of the setting terminal 23, the setting terminal 23 performs a process of creating a process command comparable to the button operation and transmitting the process command in response to the operation.

In the case where the button 221 indicating "simple registration" on the setting screen is operated, connection setting between the IoT terminal 25 and the wireless LAN access point 24 is performed on the basis of the WPS Push Button Configuration. The WPS Push Button Configuration is a scheme for establishing a wireless LAN communication path by operating physical or virtual buttons on both the IoT terminal 25 and the wireless LAN access point 24 and performing authentication therebetween.

In the case where any physical button for establishing a wireless LAN communication path is not provided to the IoT terminal 25, a command to perform, at the IoT terminal 25, a process that is comparable to that if a physical button for establishing a wireless LAN communication path is operated is created, and the command is transmitted to the IoT terminal 25.

In step S221, the setting terminal 23 creates a PBC (Push Button Configuration) starting command for operating a virtual button. FIG. 18 is a diagram depicting the PBC starting command format.

In the PBC starting command format in FIG. 18, a name "command" is written, and "startWPS" is written as the value thereof. Thus, a command for starting the WPS function of the IoT terminal 25 is written in the PBC starting command.

In addition, a name "parameter" is written, and a WPS setting option is designated as the value thereof. In the example depicted in FIG. 18, an option "pbc" is written.

Represented by "pbc" is an option to be set in the case where connection setting based on the abovementioned Push Button Configuration is performed. PIN Configuration based on a PIN input is one example of the option. Thus, an option "pin" may be written in place of "pbc."

Such a PBC starting command is created by the setting terminal 23 and is transmitted to the wireless terminal control server 21 in step S221. After receiving the PBC starting command in step S251, the wireless terminal control server 21 identifies the setting terminal 23 (user) as the transmission source and the IoT terminal 25 as the transmission destination referring to the IoT terminal database 101 in step S252. Then, in step S253, the wireless terminal control server 21 transfers the PBC starting command to the identified IoT terminal 25.

After receiving, in step S271, the PBC starting command transferred from the wireless terminal control server 21, the IoT terminal 25 starts a process corresponding to the command in step S272. That is, in this case, it is assumed that a virtual PBC button has been operated, and a state of waiting for an authentication process with respect to the wireless LAN access point 24 is provided.

Further, the lot terminal 25 transmits, to the setting terminal 23, a start notification indicating that the process has been started (step S273). The start notification from the IoT terminal 25 is temporarily transmitted to the wireless terminal control server 21 via a cellular communication path. After receiving the start notification from the IoT terminal 25 in step S254, the wireless terminal control server 21 transfers the start notification to the setting terminal 23 in step S255.

After receiving the transferred start notification in step S222, the setting terminal 23 displays, on the display section 201, a start notification screen for informing that the setting process has been started, in step S223.

Figure 19:
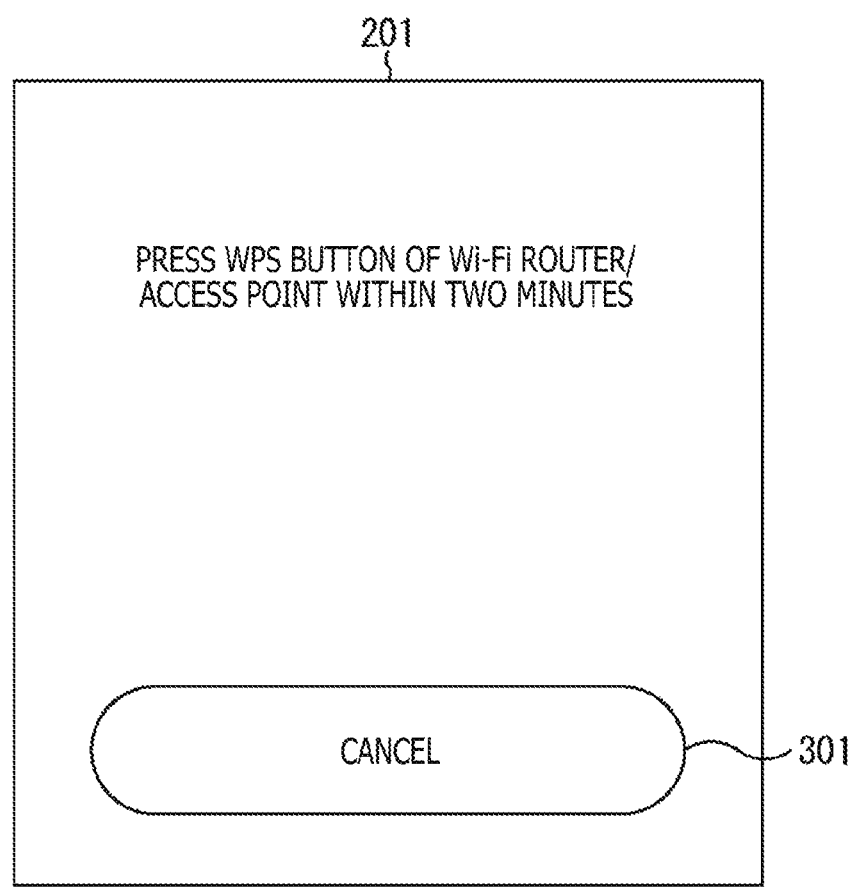
FIG. 19 is a diagram depicting one example of a screen displayed on the display section.

FIG. 19 is a diagram depicting one example of the start notification screen displayed on the display section 201. A message which reads "Press the WPS button of the Wi-Fi router/access point within two minutes," for urging the user to operate a physical button provided to the wireless LAN access point 24 is displayed on the upper part of the start notification screen.

A button 301 indicating "cancel" is displayed under such message. When the button 301 indicating "cancel" is operated, connection setting between the IoT terminal 25 and the wireless LAN access point 24 is canceled.

Such start notification screen may be displayed on the display section 201, not on the basis of the abovementioned process, but at a time when, for example, the PBC starting command is created in step S221. In the abovementioned process flow, when the IoT terminal 25 receives the PBC starting command, the start notification is transmitted, and the start notification screen is displayed at a point of time when the start notification arrives at the setting terminal 23. However, such process may be omitted.

In step S201, the user views a screen (message), such as that depicted in FIG. 19, displayed on the splay section 201 of the setting terminal 23 and recognizes that a button of the wireless LAN access point 24 needs to be operated. Then, in step S202, the user operates the button of the wireless LAN access point 24.

After receiving such button operation in step S291, the wireless LAN access point 24 starts the WPS function. When the wireless LAN access point 24 starts the WPS function, a WPS protocol is executed with respect to the IoT terminal 25 the WPS function of which has already been started. Accordingly, a wireless LAN communication path is established.

After the wireless LAN communication path is thus established between the wireless LAN access point 24 and the IoT terminal 25, the IoT terminal 25 creates a command to issue an establishment notification and transmits the command to the setting terminal 23 side in step S274. Steps following step S274 are similar to steps downing step S176 having been explained reference to FIG. 8, and thus, an explanation thereof is omitted.

As described above, according to the present technology, setting for connecting the IoT terminal 25 to the wireless LAN access point 24 can be performed by means of the setting terminal 23. Consequently, a user is not compelled to perform a complicated wireless LAN setting operation by using the IoT terminal 25 that does not have any rich user interface such as a display or a keyboard and can perform a complicated wireless LAN setting operation by using the setting terminal 23 that has a rich user interface such as a display or a keyboard.

In addition, the IoT terminal 25 can be connected to the wireless LAN access point 24 that is being managed by a particular individual in a house, a factory, or the like, in other words, the wireless LAN access point 24 that is not being managed by a particular service provider such as a cellular communication service provider. Moreover, as explained above, a process of searching for the wireless LAN access points 24 that are located in the vicinity of the IoT terminal 25 and a process for starting a WPS operation can be included in this connection setting. As such processes, any process other than the abovementioned ones can be included. Thus, the versatility can be enhanced.

As explained above, connection setting between the IoT terminal 25 and the wireless LAN access point 24 can be performed the setting terminal 23 in a simple manner. Therefore, for example, in the case where the IoT terminal 25 is a mobile terminal, even in the case where new connection setting with respect to the wireless LAN access point 24 is performed after the IoT terminal 25 is moved, the connection setting can be performed in a simple manner. Accordingly, connection to the wireless LAN access point 24 can be established, and the state where communication through the wireless LAN communication path is possible can be maintained for a long period of time, whereby the charge amount for communication through a cellular communication path can be reduced.

<Recording Medium>

The abovementioned series of processes can be executed by hardware or can be executed by software. In the case where the series of processes is executed by software, a program forming the software is installed in a computer. Here, examples of the computer include a computer incorporated in dedicated-hardware and a general-purpose personal computer capable of executing various functions by installing various programs therein.

Figure 20:
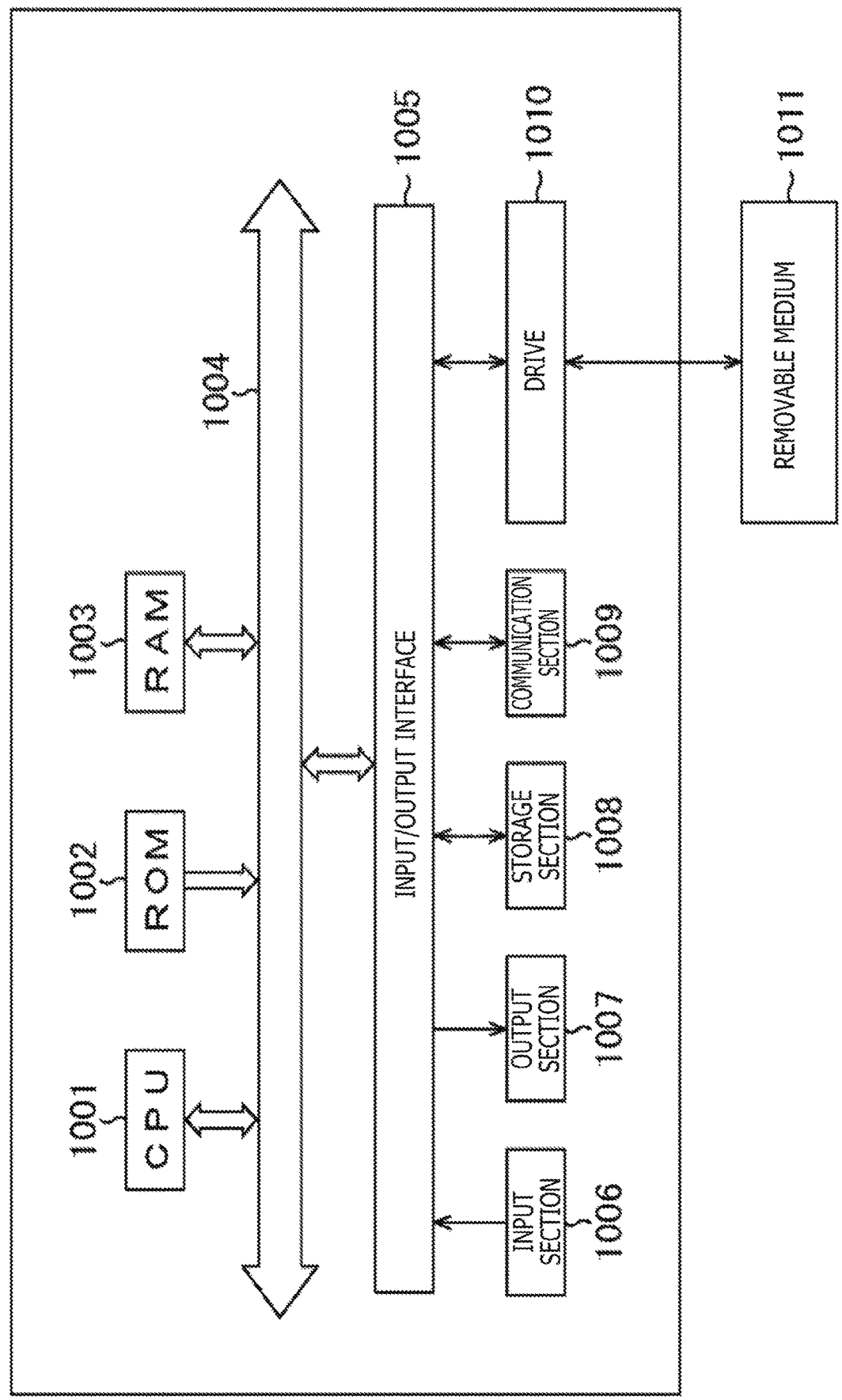
FIG. 20 is a diagram for explaining a recording medium.

FIG. 20 is a block diagram depicting a hardware configuration example of a computer that executes the abovementioned series of processes in accordance with a program. In the computer, a CPU (Central Processing Unit) 1001, a ROM (Read Only Memory) 1002, and a RAM (Random Access Memory) 1003 are mutually connected via a bus 1004. Further, an input/output interface 1005 is connected to the bus 1004. An input section 1006, an output section 1007, a storage section 1008, a communication section 1009, and a drive 1010 are connected to the input/output interface 1005.

The input section 1006 includes a keyboard, mouse, a microphone, or the like. The output section 1007 includes a display, a loudspeaker, or the like. The storage section 1008 includes a hard disk, a non-volatile memory, the like. The communication section 1009 includes a network interface or the like. The drive 1010 drives a removable medium 1011 such as a magnetic disk, an optical disk, an optomagnetic disk, or a semiconductor memory.

In the computer thus configured, the CPU 1001 loads a program stored in the storage section 1008, for example, into the RAM 1003 via the input/output interface 1005 and the bus 1004 to execute the program, whereby the abovementioned series processes is executed.

A program which is to be executed by the computer (CPU 1001) can be provided, for example, by being recorded in the removable medium 1011 as a package medium or the like. Alternatively, such a program can be provided through a wired or wireless transmission medium such as a local area network, the internet, or digital satellite broadcasting.

In the computer, when the removable medium 1011 attached to the drive 1010, a program can be installed into the storage section 1008 via the input/output interface 1005. Alternatively, a program can be received by the communication section 1009 via a wired or wireless transmission medium and be installed into the storage section 1008. Besides, a program can be installed in advance in the RUM 1002 or the storage section 1008.

It is to be noted that a program which is to be executed by the computer may be a program for executing the processes in the time-series order as explained herein or may be a program for executing the processes at a necessary timing such as a timing when a call is made.

Also, a system herein refers to the whole of an apparatus that is formed of a plurality of devices.

It is to be noted that the effects described herein are just examples, and thus, are not limitative. Therefore, other effects may be provided.

It is to be noted that the embodiments of the present technology are not limited to the abovementioned one, and various changes can be made within the scope of the gist of the present technology.

It is to be noted that the present technology may also have the following configurations.

(1)

An information processing device including:

a user interface that receives a user input concerning connection setting of a second communication path of another information processing device;

a communication section that exchanges a command with the other information processing device via a predetermined server by sing a first communication path, on the basis of the user input; and a processing section that processes the command, in which the command includes information that is necessary for the other information processing device to establish the second communication path.

(2)

The information processing device according to (1) above, in which the first communication path includes a communication path of a cellular communication network, and the second communication path includes a communication path of a wireless LAN (Local Area Network).

(3)

The information processing device according to (1) or (2) above, in which the information that is necessary for establishing the second communication path includes at least one of an SSID (Service Set Identifier), a PSK (Pre-Shared Key), or an encryption algorithm.

(4)

The information processing device according to any one of (1) to (3) above, in which the command includes a command for searching for an access point that is located in a vicinity of the other information processing device.

(5)

The information processing device according to any one of (1) to (4) above, in which an input of a password for establishing connection to an access point with respect to which the other information processing device is to establish the second communication path is received from a user via the user interface, and the command including the received password is created and is transmitted to the other information processing device.

(6)

The information processing device according to (5) above, in which in a case where establishment of the second communication path is selected by an input of the password from the user, the command for searching for the access point that is located in the vicinity of the other information processing device is transmitted to the other information processing device.

(7)

The information processing device according to any one of (1) to (3) above, in which the command includes a command for executing a function of a WPS (Wi-Fi Protected Set up) Push Button Configuration (registered trademark).

(8)

The information processing device according to (7) above, in which after the command is transmitted to the other information processing device, a message giving an instruction on an operation of a button that is provided to an access point with respect to which the other information processing device is to establish the second communication path is displayed on the user interface.

(9)

The information processing device according to any one of (1) to (8) above, in which the other information processing device includes an IoT (Internet of Things) terminal.

(10)

An information processing device including:

a first communication section that exchanges a command with another information processing device via a predetermined server by using a first communication path;

a second communication section that performs communication using a second communication path; and a processing section that processes the command, in which the command includes information that is necessary for establishing the second communication path.

(11)

The information processing device according to (10) above, in which the first communication path includes a communication path of a cellular communication network, and the second communication path includes a communication path of a wireless LAN (Local Area Network).

(12)

The information processing device according to (10) or (11) above, in which the information that is necessary for establishing the second communication path includes at least one of an SSID (Service Set Identifier), a PSK (Pre-Shared Key) or an encryption algorithm.

(13)

The information processing device according to any one (10) to (12) above, in which the command includes a command for searching for an access point that is located in a vicinity of the information processing device, and upon receiving the command to perform searching, the processing section performs, as a process corresponding to the command, searching for the access point.

(14)

The information processing device according to any one of (10) to (13) above, in which the command includes a password for establishing connection to an access point with respect to which the second communication path is to be established, and upon receiving the password, the processing section establishes the second communication path to the access point by using the password.

(15)

The information processing device according to any one (10) to (14) above in which the command includes a command for executing a function of a WPS (Wi-Fi Protected Set up) Push Button Configuration (registered trademark), and upon receiving the command, the processing section executes the function.

(16)

The information processing device according to any one of (10) to (15) above, in which the information processing device includes an IoT (Internet of Things) terminal.

(17)

An information processing system including a first information processing device and a second information processing device, in which the first information processing device includes a user interface that receives a user input concerning connection setting of a second communication path of the second information processing device, a first communication section that exchanges a command with the second information processing device via a predetermined server by using a first communication path, on the basis of the user input, and a first processing section that processes the command, the second information processing device includes a second communication section that exchanges the command with the first information processing device via the predetermined server by using the first communication path, a third communication section that performs communication using the second communication path, and a second processing section that processes the command, and the command includes information that is necessary for the second information processing device to establish the second communication path.

(18)

An information processing method for an information processing device including a user interface that receives a user input concerning connection setting of a second communication path of another information processing device, a communication section that exchanges a command with the other information processing device via a predetermined server by using a first communication path on the basis of the user input, and a processing section that processes the command, the method including:

creating and transmitting the command including information that is necessary for the other information processing device to establish the second communication path.

(19)

An information processing method for an information processing device including a first communication section that exchanges a command with another information processing device via a predetermined server by using a first communication path, a second communication section that performs communication using a second communication path, and a processing section that processes the command, the method including:

processing the command including information that is necessary for establishing the second communication path.

REFERENCE SIGNS LIST

11 Information processing system, 21 Wireless terminal control server, 22 Cellular base station, 23 Setting terminal, 24 Wireless LAN access point, 25 IoT terminal, 51 User interface section, 52 Protocol processing section, 53 Cellular communication section, 54 Antenna, 81 Protocol processing section, 82 Cellular communication section, 83 Wireless LAN communication section, 84 Antenna, 101 IoT terminal database, 102 Reception section, 103 Transmission section, 201 Display section, 221 Button, 222 Option, 241 List, 253 Button, 261 Region, 262 Input field, 281 Button, 301 Button

The invention claimed is:

1. A first information processing device, comprising:
a user interface configured to receive a user input, wherein
the first information processing device communicates with a second information processing device via a first communication path,
the first communication path includes a cellular communication network,
the user input is associated with connection setting of a second communication path of the second information processing device, and
the second communication path includes a wireless local area network (LAN); and
a processing section configured to process a command based on the user input,
wherein the command includes information that is necessary for the second information processing device to establish the second communication path; and
a communication section configured to exchange the processed command with the second information processing device via a specific server by using the first communication path, based on the user input.

2. The first information processing device according to claim 1, wherein the information that is necessary to establish the second communication path includes at least one of a Service Set Identifier (SSID), a Pre-Shared Key (PSK), or an encryption algorithm.

3. The first information processing device according to claim 1, wherein the command includes a scan command format to search for an access point that is located in a vicinity of the second information processing device.

4. The first information processing device according to claim 1, wherein
the user interface is further configured to receive, from a user, password to establish a connection between the second information processing device and an access point of the second communication path, and
the processing section is further configured to include the received password in the command, and
the communication section is further configured to transmit the command to the second information processing device.

5. The first information processing device according to claim 4, wherein,
the communication section is further configured to transmit, based on a selection of establishment of the second communication path by an input of the password from the user, a control command to the second information processing device, and
the control command is to search the access point that is located in a vicinity of the second information processing device.

6. The first information processing device according to claim 1, wherein the command includes execution of a function of a Wi-Fi Protected Set up (WPS) Push Button Configuration (registered trademark).

7. The first information processing device according to claim 6, wherein
the user interface is further configured to display, after the command is transmitted to the second information processing device, a message comprising instruction on an operation of a button that is provided to an access point with respect to which the second information processing device is to establish the second communication path.

8. The first information processing device according to claim 1, wherein the second information processing device includes an Internet of Things (IoT) terminal.

9. A first information processing device, comprising:
a first communication section configured to exchange a command with a second information processing device via a specific server by using a first communication path, wherein
the command includes information that is necessary to establish a second communication path of the first information processing device,
the first communication path includes a cellular communication network, and
the second communication path includes a wireless Local Area Network (LAN);
a processing section configured to process the command; and
a second communication section configured to perform communication using the second communication path based on the processed command.

10. The first information processing device according to claim 9, wherein the information that is necessary to establish the second communication path includes at least one of a Service Set Identifier (SSID), a Pre-Shared Key (PSK), or an encryption algorithm.

11. The first information processing device according to claim 9, wherein
the command includes a control command format to search for an access point that is located in a vicinity of the first information processing device, and
upon receiving the command to perform the searching, the processing section is further configured to execute a process corresponding to the command to search for the access point.

12. The first information processing device according to claim 9, wherein
the command includes a password to establish a connection to an access point with respect to which the second communication path is to be established, and
the processing section is further configured to establish the second communication path to the access point based on the password.

13. The first information processing device according to claim 9, wherein
the command includes execution of a function of a Wi-Fi Protected Set up (WPS) Push Button Configuration (registered trademark), and
the processing section is further configured to execute the function based on the command.

14. The first information processing device according to claim 9, wherein the first information processing device includes an Internet of Things (IoT) terminal.

15. An information processing system, comprising:
a first information processing device; and
a second information processing device, wherein
the first information processing device includes:
a user interface configured to receive a user input, wherein
the first information processing device communicates with the second information processing device via a first communication path,
the first communication path includes a cellular communication network,
the user input is associated with connection setting of a second communication path of the second information processing device, and
the second communication path includes a wireless local area network (LAN),
a first processing section configured to process a command based on the user input, wherein the command includes information that is necessary for the second information processing device to establish the second communication path; and
a first communication section configured to exchange the command with the second information processing device via a specific server by using the first communication path, based on the user input,
and
the second information processing device includes:
a second communication section configured to exchange the command with the first information processing device via the specific server by using the first communication path,
a second processing section configured to process the command to establish the second communication path, and
a third communication section configured to perform communication using the second communication path based on the command.

* * * * *